US011441987B2

(12) United States Patent
Parlak et al.

(10) Patent No.: US 11,441,987 B2
(45) Date of Patent: Sep. 13, 2022

(54) SYSTEMS AND METHODS FOR ANALYSIS OF LIQUIDS BY COVERED FLUIDIC CHANNELS INTEGRATED ONTO SENSOR PLATFORMS

(71) Applicant: Duke University, Durham (NC)

(72) Inventors: Zehra Parlak, Durham, NC (US); Stefan Zauscher, Durham, NC (US)

(73) Assignee: Duke University, Durham, NC (US)

( * ) Notice: Subject to any disclaimer, the term of this patent is extended or adjusted under 35 U.S.C. 154(b) by 812 days.

(21) Appl. No.: 16/335,874

(22) PCT Filed: Sep. 26, 2017

(86) PCT No.: PCT/US2017/053461
§ 371 (c)(1),
(2) Date: Mar. 22, 2019

(87) PCT Pub. No.: WO2018/058113
PCT Pub. Date: Mar. 29, 2018

(65) Prior Publication Data
US 2019/0257730 A1   Aug. 22, 2019

Related U.S. Application Data

(60) Provisional application No. 62/399,694, filed on Sep. 26, 2016.

(51) Int. Cl.
*G01N 9/00* (2006.01)
*B01L 3/00* (2006.01)
(Continued)

(52) U.S. Cl.
CPC ........ *G01N 9/002* (2013.01); *B01L 3/502707* (2013.01); *B01L 3/502715* (2013.01);
(Continued)

(58) Field of Classification Search
CPC ...... G01N 9/002; G01N 11/00; G01N 29/022; G01N 29/036; G01N 29/222; G01N 29/42;
(Continued)

(56) References Cited

U.S. PATENT DOCUMENTS 6,543,274 B1   4/2003   Herrmann et al.
7,500,379 B2   3/2009   Hines
(Continued)

FOREIGN PATENT DOCUMENTS

WO   2012027366 A2   3/2012

OTHER PUBLICATIONS

International Preliminary Report on Patentability and Written Opinion issued in PCT Application No. PCT/US2017/053461 dated Apr. 30, 2019 (Eleven (11) pages).
(Continued)

*Primary Examiner* — Benjamin R Schmitt
(74) *Attorney, Agent, or Firm* — Olive Law Group, PLLC

(57) ABSTRACT

Systems and methods for analysis of liquids by covered fluidic channels integrated onto sensor platforms. According to an aspect, a method includes receiving at least one of a liquid and an analyte of interest into a covered fluidic channel with a predetermined orientation. The method also includes confining at least one of the liquid and the analyte of interest within the covered fluidic channel. The method further includes analyzing properties of at least one of the liquid and the analyte of interest.

17 Claims, 19 Drawing Sheets

A)   Δf α Density x Fluid Volume

(51) Int. Cl.
*G01N 11/00* (2006.01)
*G01N 29/02* (2006.01)
*G01N 29/036* (2006.01)
*G01N 29/22* (2006.01)
*G01N 29/42* (2006.01)

(52) U.S. Cl.
CPC ............ *G01N 11/00* (2013.01); *G01N 29/022* (2013.01); *G01N 29/036* (2013.01); *G01N 29/222* (2013.01); *G01N 29/42* (2013.01); *B01L 2200/12* (2013.01); *B01L 2300/0861* (2013.01); *G01N 2011/0073* (2013.01); *G01N 2291/0255* (2013.01); *G01N 2291/0256* (2013.01); *G01N 2291/02466* (2013.01); *G01N 2291/0422* (2013.01); *G01N 2291/0426* (2013.01)

(58) Field of Classification Search
CPC . G01N 2011/0073; G01N 2291/02466; G01N 2291/0255; G01N 2291/0256; G01N 2291/0422; G01N 2291/0426; B01L 3/502707; B01L 3/502715; B01L 2200/12; B01L 2300/0861
See application file for complete search history.

(56) References Cited

U.S. PATENT DOCUMENTS

| | | |
|---|---|---|
| 7,648,844 B2 | 1/2010 | Srivastava et al. |
| 7,942,568 B1 | 5/2011 | Branch et al. |
| 2004/0238052 A1* | 12/2004 | Karp .................. B01J 19/0093 137/822 |
| 2014/0051107 A1 | 2/2014 | Babcock et al. |
| 2016/0116402 A1 | 4/2016 | Chen et al. |

OTHER PUBLICATIONS

International Search Report and Written Opinion for PCT/US17/53461 dated Nov. 27, 2017.
Communication issued in related European application No. 17854127.2 dated Jun. 30, 2020. (1 page).
Response to Communication issued in related European application No. 17854127.2 dated Nov. 12, 2020. (94 pages).
Extended European Search Report dated May 13, 2020 for associated European Patent Application No. 17854127.2.
Voiculescu, Ioana et al., "Acoustic wave based MEMS devices for biosensing applications," Biosensors and Bioelectronics 33(2012) 1-9.
Communication pursuant to Article 94(3) EPC dated Feb. 22, 2022 in associated EP Patent Application No. 17854127.2 (6 pages).

* cited by examiner

CHARACTERIZATION DEVICE
100

A PLURALITY OF COVERED FLUIDIC CHANNELS
102

AN ADHESION MECHANISM TO A SENSOR PLATFORM
104

$\Delta f_1 = -4$ Hz
$\Delta f_7 = -34$ Hz

SYSTEMS AND METHODS FOR ANALYSIS OF LIQUIDS BY COVERED FLUIDIC CHANNELS INTEGRATED ONTO SENSOR PLATFORMS

CROSS REFERENCE

This is a 371 national stage patent application, which claims priority to PCT International Patent Application No. PCT/US2017/053461, filed Sep. 26, 2017, and titled SYSTEMS AND METHODS FOR ANALYSIS OF LIQUIDS BY COVERED FLUIDIC CHANNELS INTEGRATED ONTO SENSOR PLATFORMS, which claims the benefit of the U.S. Provisional Application Ser. No. 62/399,694 filed on Sep. 26, 2016 and titled SYSTEMS AND METHODS FOR MICROFLUIDICS INTEGRATED SHEAR ACOUSTIC WAVE-BASED MASS SENSORS AND METHODS OF USE, the disclosures of which are incorporated herein by reference in its entirety their entireties.

TECHNICAL FIELD

The presently disclosed subject matter relates to the analysis of a liquid and/or an analyte. More particularly, the presently disclosed subject matter relates to systems and methods for analysis of liquids by covered fluidic channels integrated onto sensor platforms.

BACKGROUND

The ability to analyze analytes and liquids has long been a mainstay of diagnostics. For instance, sensing the presence, adsorption, and binding of analytes in a liquid solution is essential for many applications such as medical diagnostics, food safety control, drug tests, and environmental monitoring. Thickness-shear mode resonators (TSR), such as quartz crystal microbalances (QCMs) and shear film-bulk-acoustic resonators (FBARs), are among the devices that have been used in label-free particulate sensing in gaseous and liquid environments.

However, performing measurements in liquid environment using TSR based mass sensors, such as QCM and shear FBARs, resulted in limitations regarding the sensors' sensitivity, geometry, and sensing electronics. For instance, when one side of the TSR sensor faces a liquid, the TSR becomes highly damped and its quality factor (Q-factor) decreases. A lower Q-factor makes it more difficult to resolve resonance frequency shifts leading to a worse mass resolution for the device. While a potential solution of using thin resonators that operate at higher fundamental frequencies can offer better sensitivity in ambient/vacuum environments, such environments might not be present when analyzing liquid solutions. Moreover, at higher resonance frequencies in liquid measurements, the Q-factor of these thin resonators are significantly reduced. This effect counteracts the sensitivity enhancement provided by the miniaturization, thus negating the solution of using these resonators. For example, the Q-factor of a 10 MHz QCM is ~2000 when facing water, while the Q-factor of a 790 MHz shear FBAR is ~100 facing water. While FBAR devices have support since they are fabricated on a wafer, thinning QCM crystals do not because they are stand-alone devices that get handled countless times in their lifetimes. Instead, QCM crystals are placed on a support structure (such as O-rings or clamps) that seals one side of the crystal for operation in a liquid environment. To reduce the damping due to this support structure, the crystals must be designed to have blank diameters much higher than the active electrode region. This would then be yet another design parameter that has to be factored into the construction of the QCM crystal.

For the analysis of the analytes and/or liquid to be accurate, the TSR sensors also have to be very smooth and polished, since surface roughness can trap liquid molecules, making it appear as if the analyte is adsorbed to the surface when it might not be. Therefore, the electrodes on the TSR surface have to be thoroughly polished, which can be tedious and costly. In addition, several microliters to milliliters of fluid are required to cover one electrode of the TSR sensors and even more fluid is required to fill in the fluid chamber and fluid lines. This is problematic when the sample from which the analyte and/or liquid to be tested may be limited. Thus, such a high requirement of sample volume may not even be available for testing. Even if the sample volume could be obtained, dispersion of the sample can be a problem as it is highly dependent on the hydrodynamics of the fluid cell the TSR is placed in.

Proposed testing methods have included immersing the TSR sensor in liquid. However, doing so causes mechanical/hydrodynamic problems, as well as complicates the sensor's electronics. Since the Q-factor of a TSR sensor is highly reduced when facing liquid compared to the air/vacuum environments, it becomes harder to create oscillations and track the resonance frequency when the sensor is immersed in liquid. The Q-factor of the TSR becomes an important part of the measurement in liquid by indicating the presence of different fluids and thin/thick organic layers. Therefore, the Q-factor has to be carefully monitored, which makes designing the electronics part of the sensor even more complex.

The above limitations, such as the complicated electronics, large fluid sample volume requirement, and fragility of the sensors, have confined TSR sensors to a lab setting. While some researchers had considered it as a measurement tool to monitor patients' blood proteins or some viruses in real-time, the amount of required sample volume and the bulkiness of the whole instrument make this impractical. In addition, the high cost of commercial QCM crystals, priced anywhere between $20-200 per crystal, make the solution untenable because a complete QCM system costs $2K-100K. This price point is too high for portable point-of-care (POC) diagnostic devices.

Indeed, preventing the loss of sensitivity of TSR sensors in liquid environments could make it more competitive for biomedical, food safety, military, and environmental applications. In addition, if the miniaturization of these sensors can give reliable and accurate results, it would enable these sensors to become more widespread, opening up new possibilities for POC diagnostics.

Conventional viscometers determine viscosity of liquids by, for e.g., capillary flow in tubes, rotational or oscillating probes, or by monitoring flow in rectangular-slit channels. These viscometers are often expensive, require operation by trained personnel, typically need large liquid volumes, and/or entail long measurement times. Likewise, conventional sensors have limitations that confine them to a lab setting such as complicated electronics, high fluid sample volume requirement, high cost, and fragility of the sensors.

Therefore, a solution is needed that can allow for easy and accurate analysis of liquids and/or analytes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for analysis of liquids by covered fluidic channels integrated onto sensor platforms. According to an aspect, a method includes receiving at least one of a liquid and an analyte of interest into a covered fluidic channel with a predetermined orientation. The method also includes confining at least one of the liquid and the analyte of interest within the covered fluidic channel. The method further includes analyzing properties of at least one of the liquid and the analyte of interest.

BRIEF DESCRIPTION OF THE DRAWINGS

The foregoing summary, as well as the following detailed description of various embodiments, is better understood when read in conjunction with the appended drawings. For the purposes of illustration the drawings show exemplary embodiments; however, the presently disclosed subject matter is not limited to the specific methods and instrumentalities disclosed. In the drawings:

FIG. 1 is a block diagram of an example system for systems and methods for analysis of liquids by covered fluidic channels integrated onto sensor platforms in accordance with embodiments of the present disclosure;

DETAILED DESCRIPTION

Figure 2:
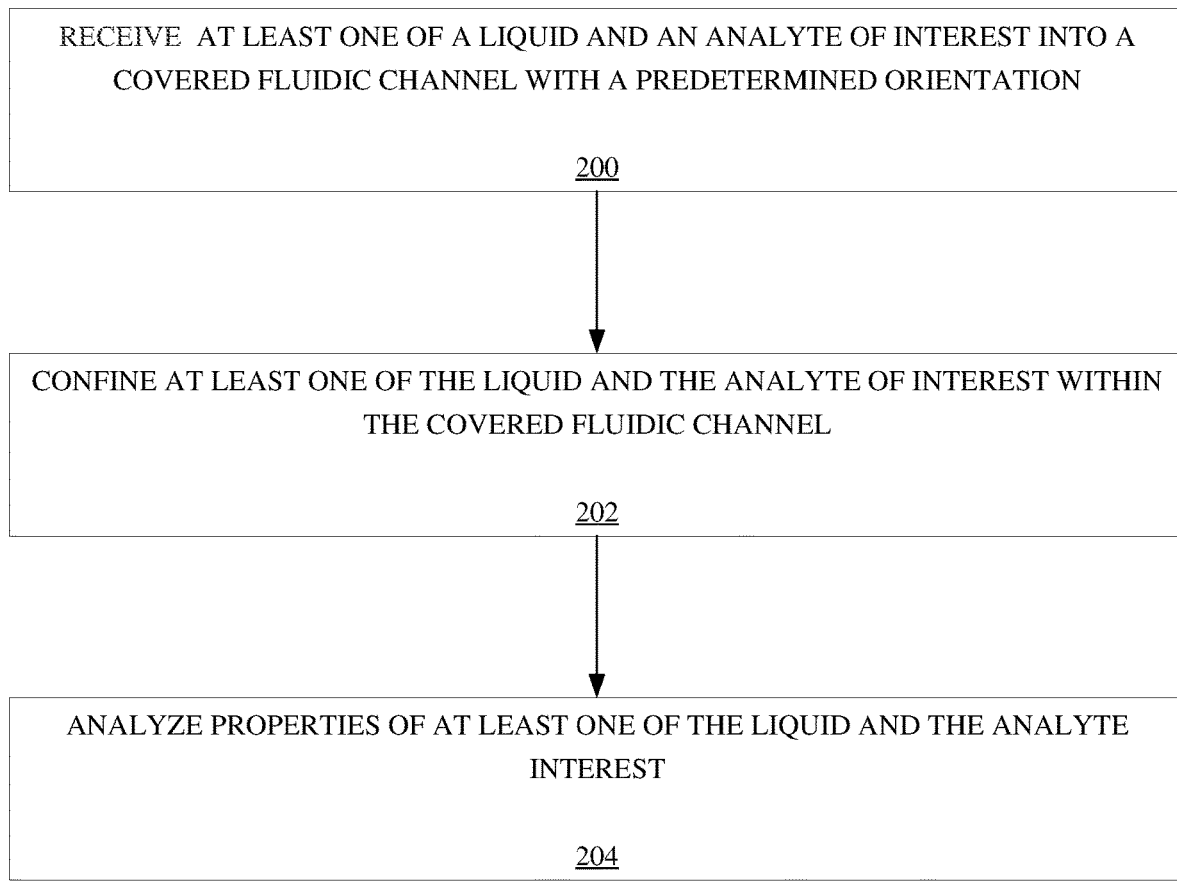
FIG. 2 is a flowchart of an example method for implementing systems and methods for analysis of liquids by covered fluidic channels integrated onto sensor platforms in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

The present disclosure relates to the integration of fluidic channels, such as nanofluidic or microfluidic channels, to a sensor platform. The integration of the fluidic channels to the sensor platform can provide a higher sensitivity of the liquid sample and/or analytes and miniaturization capabilities for use in point-of-care devices. Furthermore, the integration and fabrication of the fluidic channels can be done using fabrication techniques already used in the semiconductor industry, enabling low manufacturing costs.

As referred to herein, the term "sensor platform" should be broadly construed. It can include any type of device including resonators, acoustic devices, microbalances, quartz crystals and the like, and combinations thereof. A sensor platform may include, but is not limited to: a shear wave resonator (SWR), a thickness shear mode resonator (TSR), a quartz crystal microbalance (QCM), an AT-cut quartz crystal, a film bulk acoustic resonator (FBAR), a shear mode film bulk acoustic resonator (S-FBAR), a shear horizontal surface acoustic wave (SH-SAW) device, and a love-mode device.

As referred to herein, the term "characterization device" should be broadly construed. It can include, in an example, fluidic channels comprising a predetermined width and height with an orientation that is attached to an adhesion mechanism to a sensor platform and the like. The fluidic channels can be nano/microfluidic channels. Additional examples of the characterization device are further described herein.

In accordance with the embodiments, the present disclosure provides systems and methods for analysis of liquids by covered fluidic channels integrated onto sensor platforms. For example, FIG. 1 illustrates a block diagram of an example system for systems and methods for analysis of liquids by covered fluidic channels integrated onto sensor platforms. Referring to FIG. 1, the system includes a characterization device 100 that can encompass a plurality of covered fluidic channels 102 comprising a predetermined width and height with an orientation. The fluidic channels 102 are comprised to receive at least one of a liquid and an analyte of interest into the covered fluidic channels 102, confine at least one of the liquid and the analyte of interest within the covered fluidic channels 102, and analyze properties of at least one of the liquid and the analyte interest. In an example, the fluidic channels 102 can comprise at least one of microfluidic channels and nanofluidic channels. That is, the fluidic channels 102 can be either microfluidic channels or nanofluidic channels. In an example, the fluidic channels 102 are composed of a material with a high elastic modulus and a low loss modulus to enable low dissipation motion that matches a surface motion of the sensor platform at high frequency. For instance, the material can be a composition of at least one of silicon, silicon dioxide, aluminum, gold, titanium, titanium/aluminum, chromium and a stiff polymer. The channel walls are composed of materials that are stiff and have a low loss modulus in order to create low dissipative motion, i.e. without lagging with respect to the surface, within the channels 102. With regards to the perpendicularly oriented channels 102, the liquid sample moves with low dissipative motion, so using a material of high elastic modulus and a low loss modulus enables these channels 102 to provide sensitive mass and density detection. This is because such materials can eliminate dissipation of the liquid.

Still referring to FIG. 1, the orientation of the fluidic channels 102 comprises at least one of a parallel orientation to sense a product of a fluid viscosity and density, a perpendicular orientation to sense a density property, and a combination of the parallel orientation and the perpendicular orientation to sense a fluid viscosity. The orientation of the fluidic channels 102 further comprises at least one of a perpendicular orientation to sense a mass property of the liquid, and at least one of the perpendicular orientation and a parallel orientation of the covered fluidic channel 102 to sense a mass property of an analyte attached to a channel surface of the covered fluidic channel 102. The combination of the parallel orientation and the perpendicular orientation of the fluidic channels 102 can be further arranged in at least one of a serial configuration and a parallel configuration on the sensor platform depending on the property one wishes to analyze, i.e. liquid or analyte.

Still referring to FIG. 1, the height of the fluidic channels 102 can be determined, in an example, based on a measure of an acoustic wavelength inside channel walls at an operating frequency range and setting the height to be lower than the measured acoustic wavelength. This comprises, in an example, a determination of either a harmonic range of the sensor platform or a surface acoustic wave actuation frequency. For instance, the fluidic channel 102 can be composed of an aluminum material and have a channel height of 1.5 micrometer or less for a 5 MHz shear motion (and up to a $7^{th}$ harmonic at 35 MHz) because the wavelength in the aluminum channel is ~600 micrometer (~90 micrometer for 35 MHz shear motion). For higher operating frequencies, the wavelength will be lower, and thus the channel height should be lower.

Still referring to FIG. 1, the width of the fluidic channels 102 can be determined, in an example, based on the predetermined height and an operating frequency of the device 100. That is, the channel width is designed while considering the channel height and operating frequency. In an example, the width has been determined to be 5× to 10× the channel height. This manner of using the acoustic wavelength inside the channel 102, which is composed of some material, to determine the channel height and width is a novel way to design channel 102 dimensions.

Still referring to FIG. 1, the characterization device 100 also includes an adhesion mechanism 104 to a sensor platform. In an example, the sensor platform comprises of at least one of a shear wave resonator, a thickness shear mode resonator (TSR), a quartz crystal microbalance (QCM), a film bulk acoustic resonator (FBAR), a shear mode film bulk acoustic resonator (S-FBAR), a shear horizontal surface acoustic wave (SH-SAW) device, and a love-mode device. A love-mode device is a SH-SAW device that is modified to have wave-guiding elements through an extra layer, resulting in a love-mode surface acoustic wave device. The adhesion mechanism 104 comprises at least one of a gold layer between the covered fluidic channels 102 and the sensor platform, a silicon layer between the covered fluidic channels 102 and the sensor platform, and a silicon dioxide layer between the covered fluidic channels 102 and the sensor platform.

FIG. 2 illustrates a flowchart of an example method for implementing systems and methods for analysis of liquids by covered fluidic channels integrated onto sensor platforms in accordance with embodiments of the present disclosure. The method of FIG. 2 is described by example as being implemented by the characterization device 100 shown in FIG. 1, although it should be understood that the method may be implemented by any suitable characterization device(s). Additionally, reference is also made to the flowchart shown in FIG. 3, which is described in further detail herein in accordance with embodiments of the present disclosure.

Referring to FIG. 2, the method includes receiving 200 at least one of a liquid and an analyte of interest into a covered fluidic channel 102 with a predetermined orientation. The covered fluidic channel 102 comprises at least one of microfluidic channels and nanofluidic channels. In an example, receiving 200 at least one of the liquid and the analyte of interest occurs via at least one of the following: a flow action, an injection action, a capillary action, and a suction action. In an example, the at least one of the liquid and the analyte of interest comprises at least one of a liquid mixture, blood, oil, and an analyte.

Still referring to FIG. 2, the predetermined orientation of the fluidic channels 102 is based on a surface motion of the sensor platform. As such, the predetermined orientation comprises at least one of a perpendicular orientation of the fluidic channels 102 integrated to a sensor platform, a parallel orientation of the fluidic channels 102 integrated to the sensor platform, and a combination of the parallel orientation and the perpendicular orientation. This combination of the parallel orientation and the perpendicular orientation can be further arranged in at least one of a serial configuration and a parallel configuration on the sensor platform. In an example, the sensor platform comprises of at least one of a shear wave resonator (SWR), a thickness shear mode resonator (TSR), a quartz crystal microbalance (QCM), a film bulk acoustic resonator (FBAR), a shear mode film bulk acoustic resonator (S-FBAR), a shear horizontal surface acoustic wave (SH-SAW) device, and a love-mode device. A love-mode device is a SH-SAW device that is modified to have wave-guiding elements through an extra layer, resulting in a love-mode surface acoustic wave device.

The method of FIG. 2 also includes confining 202 at least one of the liquid and the analyte of interest within the covered fluidic channel 102. The method of FIG. 2 further includes analyzing 204 properties of at least one of the liquid and the analyte interest. Analyzing 204 comprises at least one of analyzing a product of a fluid viscosity and density via a parallel orientation of the covered fluidic channel 102, a density property via a perpendicular orientation of the covered fluidic channel 102, and a fluid viscosity via a combination of the parallel and the perpendicular orientation of the covered fluidic channel 102. In addition, analyzing 204 properties further comprises at least one of a mass property of the liquid via a perpendicular orientation of the covered fluidic channel 102, and a mass property of an analyte attached to a channel surface of the covered fluidic channel 102 via at least one of the perpendicular orientation and a parallel orientation of the covered fluidic channel 102.

Figure 3:
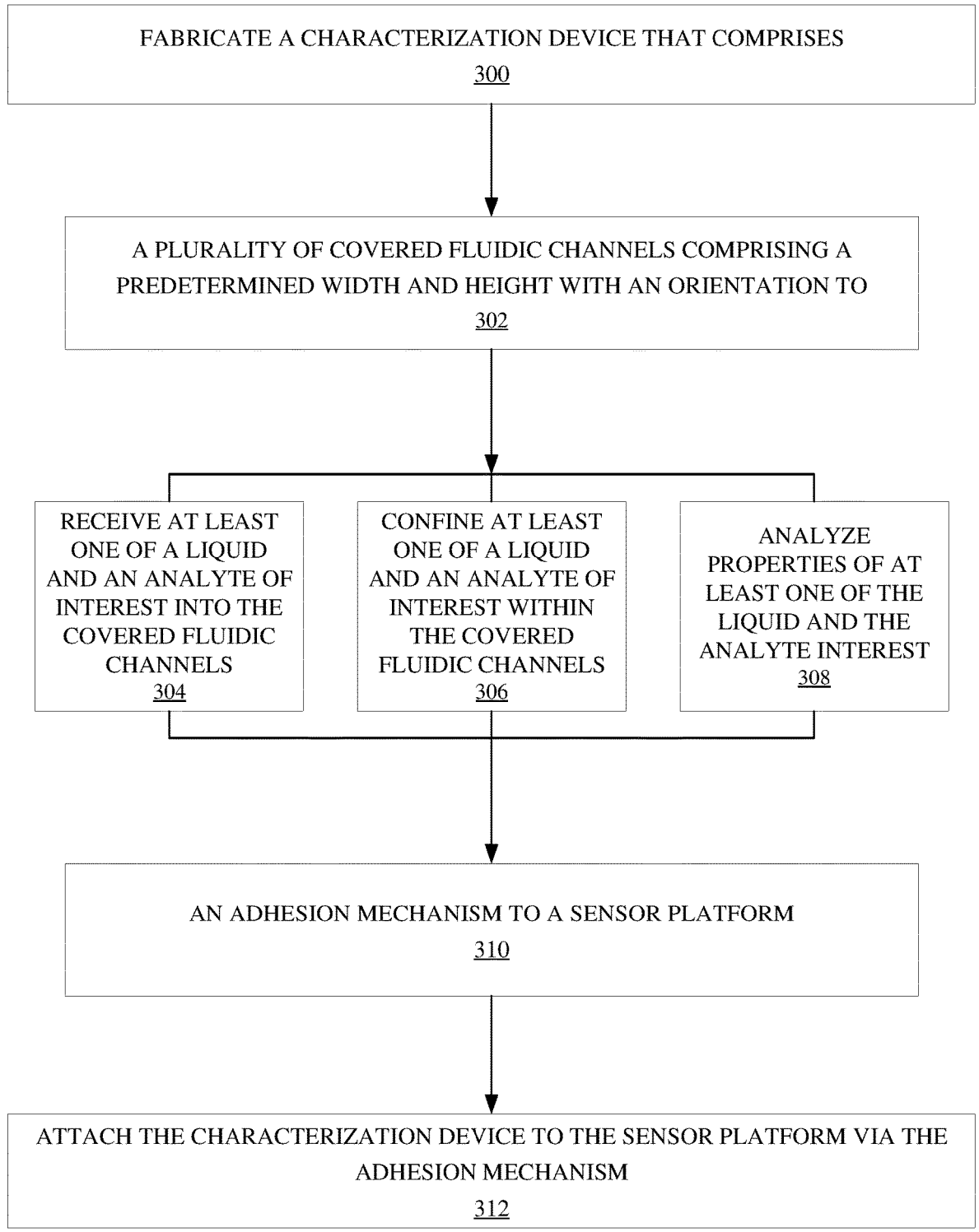
FIG. 3 is a flowchart of an example method for fabricating a characterization device in accordance with embodiments of the present disclosure.

Referring now to FIG. 3, this figure illustrates a flowchart of an example method for fabricating 300, i.e. microfabricating, a characterization device 100 that comprises a plurality of covered fluidic channels 102 comprising a predetermined width and height with an orientation 302, and an adhesion mechanism 104 to a sensor platform 310. The plurality of covered fluidic channels 102 with predetermined width and height with an orientation 302 is to: receive 304 at least one of a liquid and an analyte of interest into the covered fluidic channels 102; confine 306 at least one of a liquid and an analyte of interest within the covered fluidic channels 102; and analyze 308 properties of at least one of the liquid and the analyte interest. The adhesion mechanism 104, 310 comprises at least one of a gold layer between the covered fluidic channels 102 and the sensor platform, a silicon layer between the covered fluidic channels 102 and the sensor platform, and a silicon dioxide layer between the covered fluidic channels 102 and the sensor platform.

Still referring to FIG. 3, fabricating 300 comprises of etching, patterning, sputtering, 3D printing, sintering, molding and curing, and deposition. That is, fabricating 300 can comprise patterning photoresist, depositing a material layer, opening an inlet-outlet cavity, and removing photoresist to display the covered fluidic channels 102. In an example, the photoresist is used to pattern a template for the covered fluidic channels 102; a tiny layer of material (such as chromium or titanium) is deposited; and then a thick layer of another material (such as aluminum, copper or titanium) is deposited; followed by an opening of the inlet-outlet cavities at both ends of the characterization device 100. That is, in an example, the characterization devices 100 have at least one inlet cavity and at least one outlet cavity. The inlet cavity comprises, in an example, a channel that is covered. The liquid sample is administered to the inlet, wherein it then travels, passing the covered fluidic channels 102 until it reaches the outlet. Initially, the inlet-outlet cavity is covered by, in an example, aluminum in the deposition of a thick layer of another material step, but this aluminum layer is later removed from the inlet-outlet cavity to create an opening. This partly finished product of the fluidic channels 102 can then be immersed in, in an example, a solvent like acetone to remove the photoresist. The removal of the aluminum from the inlet-outlet cavity enables the acetone to get into the fluidic channels 102 to remove any remaining photoresist within the fluidic channels 102. Afterwards, the channels 102 are washed with an agent such as ethanol and then dried. The result is the covered fluidic channels 102 that are, in this example, composed of aluminum.

Still referring to FIG. 3, the method also includes attaching 312 the characterization device 100 to the sensor platform via the adhesion mechanism 104. In an example, the sensor platform comprises of at least one of a shear wave resonator, a thickness shear mode resonator (TSR), a quartz crystal microbalance (QCM), a film bulk acoustic resonator (FBAR), a shear mode film bulk acoustic resonator (S-FBAR), a shear horizontal surface acoustic wave (SH-SAW) device, and a love-mode device. A love-mode device is a SH-SAW device that is modified to have wave-guiding elements through an extra layer, resulting in a love-mode surface acoustic wave device.

Still referring to FIG. 3, the covered fluidic channels 102 comprise at least one of microfluidic channels and nanofluidic channels. The covered fluidic channels 102 comprise a material with a high elastic modulus and a low loss modulus to enable a low dissipation motion that matches a surface motion of the sensor platform at high frequency. In an example, the material comprises a composition of at least one of silicon, silicon dioxide, aluminum, gold, titanium, titanium/aluminum, chromium, and a stiff polymer.

Still referring to FIG. 3, the orientation 302 comprises at least one of a parallel orientation to sense a product of a fluid viscosity and density, a perpendicular orientation to sense a density property, and a combination of the parallel orientation and the perpendicular orientation to sense a fluid viscosity. The orientation 302 further comprises at least one of a perpendicular orientation to sense a mass property of the liquid, and at least one of the perpendicular orientation and a parallel orientation of the covered fluidic channel 102 to sense a mass property of an analyte attached to a channel surface of the covered fluidic channel 102. The combination of the parallel orientation and the perpendicular orientation can be further arranged in at least one of a serial configuration and a parallel configuration on the sensor platform.

Still referring to FIG. 3, attaching 312 the characterization device 100 to the sensor platform via the shear motion 104, 310 comprises at least one of etching, wafer bonding, thin-film bonding, and chemical pretreatment of surfaces and applying pressure. Attaching 312 can also comprise a distribution of the covered fluidic channels 102 over at least one of an active region of the sensor platform, a sensitive region of the sensor platform, and in a middle central location of the sensor platform.

Examples that can embody the presently disclosed subject matter are now described in more detail.

Figure 4A:
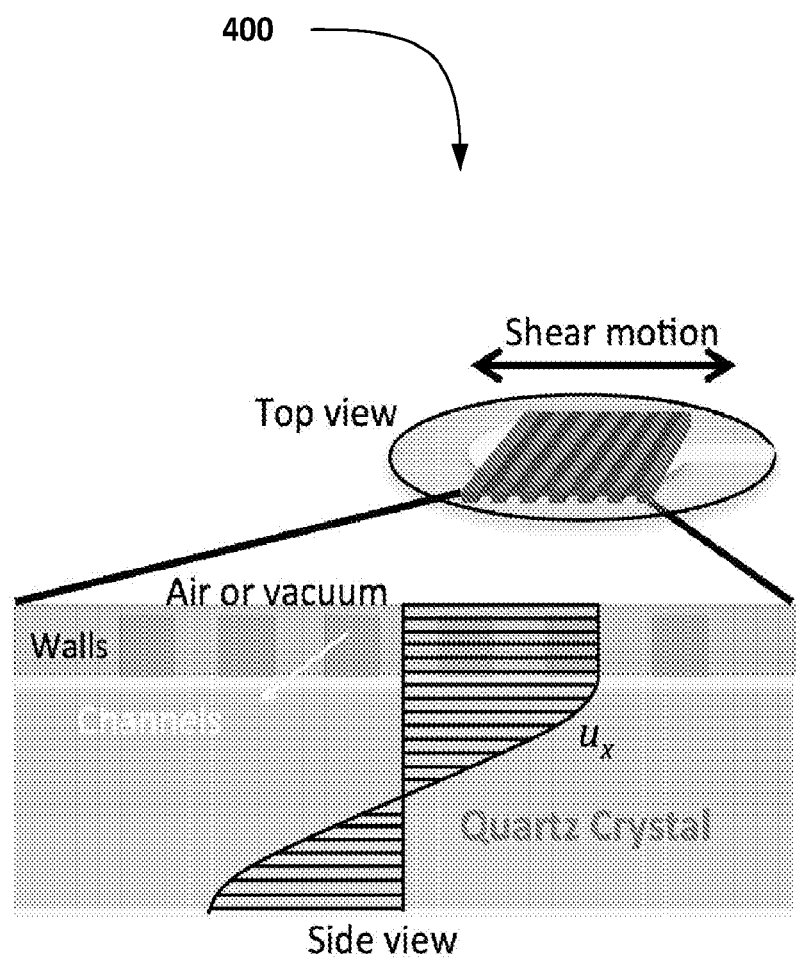
FIG. 4A and FIG. 4B show an example shear motion of the device in accordance with embodiments of the present disclosure.
Figure 4B:
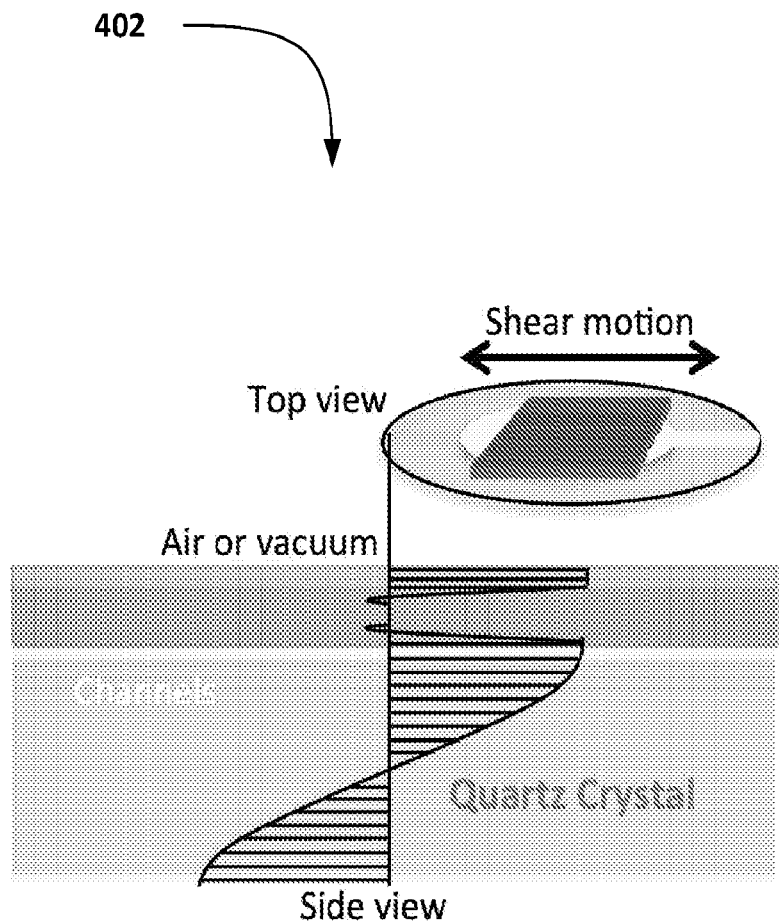

FIG. 4A and FIG. 4B shows an example shear motion 400, 402 of the characterization device 100 in accordance with embodiments of the present disclosure. FIG. 4A shows part (a) 400 of, in an example, a cross-sectional view of a simplified sensor platform, such as a thickness-shear resonator, with microfluidic channels 102 on top in a perpendicular orientation. The resonators can be AT-cut quartz crystal resonators and the microfluidic channels 102 can be created using a microfabrication 300 process. These channels 102 are oriented perpendicularly to the main shear motion direction of the sensor platform's surface. The channels 102 can be comprised of a stiff material, such as aluminum, with dimensions such as 5-7 micrometer wide and 1.5 micrometer high.

Still referring to FIG. 4A part (a) 400, the quartz crystal surface moves horizontally in an x-direction with $u_x$ amplitude wherein the solid channel walls follow this horizontal motion. Liquid is trapped within the covered fluidic channels 102, wherein the characterization device 100 can be operable in air or vacuum. This is done so that only the liquid sample within the channels 102 will affect the measurements. As such, the solid channel walls force the liquid to move with the same velocity as the quartz crystal surface of the sensor platform, thus enabling the liquid to be observed as a rigidly-coupled mass by the crystal. Therefore, the observed frequency shifts are only a result of the mass loading due to the trapped liquid, i.e. a density property. The liquid volume required for density measurements can be on the order of nanoliters. Thus, these microfluidic channels 102 with high elasticity channel walls can be placed in perpendicular orientation to the surface shear motion of the sensor platform, which then forces the liquid sample to move in-phase with the surface shear motion. The loading of the quartz crystal reflects the density and volume of the trapped liquid sample.

Still referring to FIG. 4A part (a) 400, the advantage of having the channels 102 in a perpendicular orientation is that the operating frequency can be increased without temperature fluctuation related or liquid damping related sensitivity problems. Thinner sensor platforms, such as those in some resonators, with high operating frequency can be highly sensitive in liquid operation since the mass is that of the liquid sample and/or analyte, which can affect the fluid density or adsorption measurement inside the channels 102.

Example potential applications for perpendicularly oriented channels 102 attached 312 on a sensor platform can include: detection of low concentration analytes in liquid for laboratory-based research instruments, biomedical diagnostics, environmental detection, industrial quality control, and food processing related pathogens, just to name a few.

Referring to FIG. 4B, part (b) 402 shows, in an example, a cross-sectional view of a simplified sensor platform, such as a thickness-shear resonator, with microfluidic channels 102 on top in a parallel orientation. Similar to part (a), the resonators can be AT-cut quartz crystal resonators and the microfluidic channels 102 can be created using a microfabrication 300 process. However, the fluidic channels 102 here are oriented in a parallel manner to the main shear motion direction of the surface of a sensor platform. The channels 102 can be comprised of a stiff material, such as aluminum, with dimensions such as 5-7 micrometer wide and 1.5 micrometer high. The placement of the high elasticity channels 102 in a parallel orientation to the surface shear motion of the sensor platform enables the channels 102 to move in-phase with the surface. The loading of the quartz crystal now reflects the fluid dissipation effects of the fluid in the channels 102 since the shear motion amplitude $u_x$ of the liquid decreases exponentially in the parallel orientation.

Still referring to FIG. 4B part (b) 402, the advantage of having the channels 102 in a parallel orientation is that the sensor platform can respond to both the fluid property (i.e. fluid viscosity) and mass adsorption property inside the channels 102. In an example, a non-fouling coating can be used inside the channels 102, if so desired, to prevent mass adsorption of the analyte, enabling the sensor platform to just respond to fluid viscosity changes. A non-fouling coat is one that does not adsorb any kind of analyte. Examples of non-fouling coat can include, but are not limited to: polymer brushes, such as poly[oligo(ethylene glycol) methyl ether methacrylate] (poegma); zwitterionic polymers, such as poly(carboxybetaine acrylamide) (polyCBAA); self-assembled monolayers, such as thiolated and silanated PEG. As such, a non-fouling coat is beneficial for viscosity sensing in complex solutions because it removes the element of analyte mass adsorption from the gathered data. Example potential applications for channels 102 in a parallel orientation attached 312 on a sensor platform can include: viscosity sensing for pharmaceutical or industrial testing of liquid mixtures or oils, or biomedical applications such as detecting coagulation times in blood samples, just to name a few.

Still referring to FIG. 4B part (b) 402, upon introduction of the liquid sample, the resonance frequency shifts in the parallel oriented microfluidic channels 102 will be proportional to the square root of the product of density and viscosity (i.e., $\Delta f_c \sim (\rho\eta)^{1/2}$) and the surface area of the channels. The relationship between $\Delta f_c$ and $\rho\eta$ are shown by this equation:

$$\sqrt{\rho\eta} = \frac{\Delta f_c C \sqrt{4\pi f_c}}{N},$$

wherein $f_c$ is the center frequency of the resonance mode, N is the mode number, and C is the sensitivity constant (e.g., $17.7 \times 10^{-9}$ g s cm$^{-2}$ for the 5 MHz quartz crystals). This equation allows for a calculation of $\sqrt{\rho\eta}$ using the resonance frequency shift due to the liquid. Basically, when liquid interfaces one or both sides of a thin quartz crystal, it creates fluid loading and damping. These loading and damping effects, which are proportional to the square root of the product of density and viscosity (i.e., $\Delta f \sim (\rho\eta)^{1/2}$), reduce the resonance frequency and quality factor (Q-factor) of the crystal. The product of the density and viscosity can be calculated by examining the resonance frequency/Q-factor shifts. The Q-factor is described by this equation: Q=1/Dissipation(D). While the product of the density and the viscosity of the liquid can be calculated, these properties cannot be decoupled in conventional quartz crystal resonator sensors without additional data input (obtained from independent measurements of density or viscosity). The present disclosure, as depicted in FIG. 4A and FIG. 4B 400, 402, allows for such decoupling through the use of, in an example, quartz crystal resonators (i.e., AT-cut crystals that resonate at thickness-shear mode) with covered fluidic channels 102 integrated on top of the sensors. This decoupling effect is described in FIG. 12A, FIG. 12B, and FIG. 12C. Quartz crystal resonators can be used to measure adsorbed mass on its surface since doing so reduces the resonance frequency of the crystal resonator with the mass loading effect.

Still referring to FIG. 4A and FIG. 4B, while parts (a) 400 and (b) 402 depict the fluidic channels 102 in a perpendicular and parallel orientation, respectively, the channels 102 can also be placed in a combination of both orientations, allowing the fluid to flow from one orientation to the another one as the sensor platform measures density and fluid viscosity sequentially. As described above, the shift in resonance frequency of the perpendicularly oriented channels 102 is proportional to the liquid density and the microfluidic channel 102 volume, whereas the resonance frequency shifts in the parallel oriented channels 102 will be proportional to the square root of the product of density and viscosity (i.e., $\Delta f \sim (\rho\eta)^{1/2}$) and the surface area of the channels 102. Thus, the results of these two measurements can be combined to decouple the density and viscosity of the liquid, enabling one to obtain accurate quantitative values for both. To achieve such a orientation combination, fluidic channels 102 with different orientations can be placed on different regions on the sensor platform surface and can operate separately, or they can be connected to each other, whereby fluid passes first through one followed by the other, and time-resolved resonance frequency shifts can be used to de-convolute the density and viscosity. The combination of the parallel orientation and the perpendicular orientation of channels 102 can be arranged in at least one of a serial configuration and a parallel configuration on the sensor platform. The channels 102 can then be distributed over at least one of an active region of the sensor platform, a sensitive region of the sensor platform, and in a middle central location of the sensor platform. In an example, the channels 102 can be placed in the more sensitive part of the sensor platform, i.e., towards the center of the electrode on the resonator. The distribution of the channels 102 is application dependent. Thus, in an example, detecting a low concentration of analyte particles necessitates concentrating the channels 102 towards the center of the sensor platform to yield better results.

Still referring to FIG. 4A and FIG. 4B 400, 402, while the sensor platform AT-cut quartz resonators was described, the sensor platform can comprise of at least one of a shear wave resonator (SWR), a thickness shear mode resonator (TSR), a quartz crystal microbalance (QCM), a film bulk acoustic resonator (FBAR), a shear mode film bulk acoustic resonator (S-FBAR), a shear horizontal surface acoustic wave (SH-SAW) device, and a love-mode device. In an example, the channels 102 can be fabricated 300 using stiff and low-dissipation materials, comprising a composition of at least one of silicon, silicon dioxide, aluminum, gold, titanium, titanium/aluminum, chromium, and a stiff polymer.

Still referring to FIG. 4A and FIG. 4B 400, 402, the total volume required to fill these channels 102 can be as small as a few tens of nanoliters, which represents a reduction on the order of $10^6$ of the amount of liquid samples needed in conventional systems. The measurement using the characterization device 100 will also be very fast, since the channels 102 are filled within seconds, allowing for measurements to be completed quickly and efficiently. The liquid sample is contained within the fluidic channels 102 on the sensor platform, such as a thickness-shear mode resonator, and thus, the liquid sample will not have an air interface during the measurement. This is beneficial for air-sensitive samples, such as liquids containing biomolecules, because air interfaces can adversely impact measurements. While FIG. 4A and FIG. 4B 400, 402, show the channels 102 as standalone devices, other components such as temperature sensors, heater elements, and electrochemical elements, just to name a few, can also be integrated onto sensor platform during the microfabrication 300 process.

Figure 5:
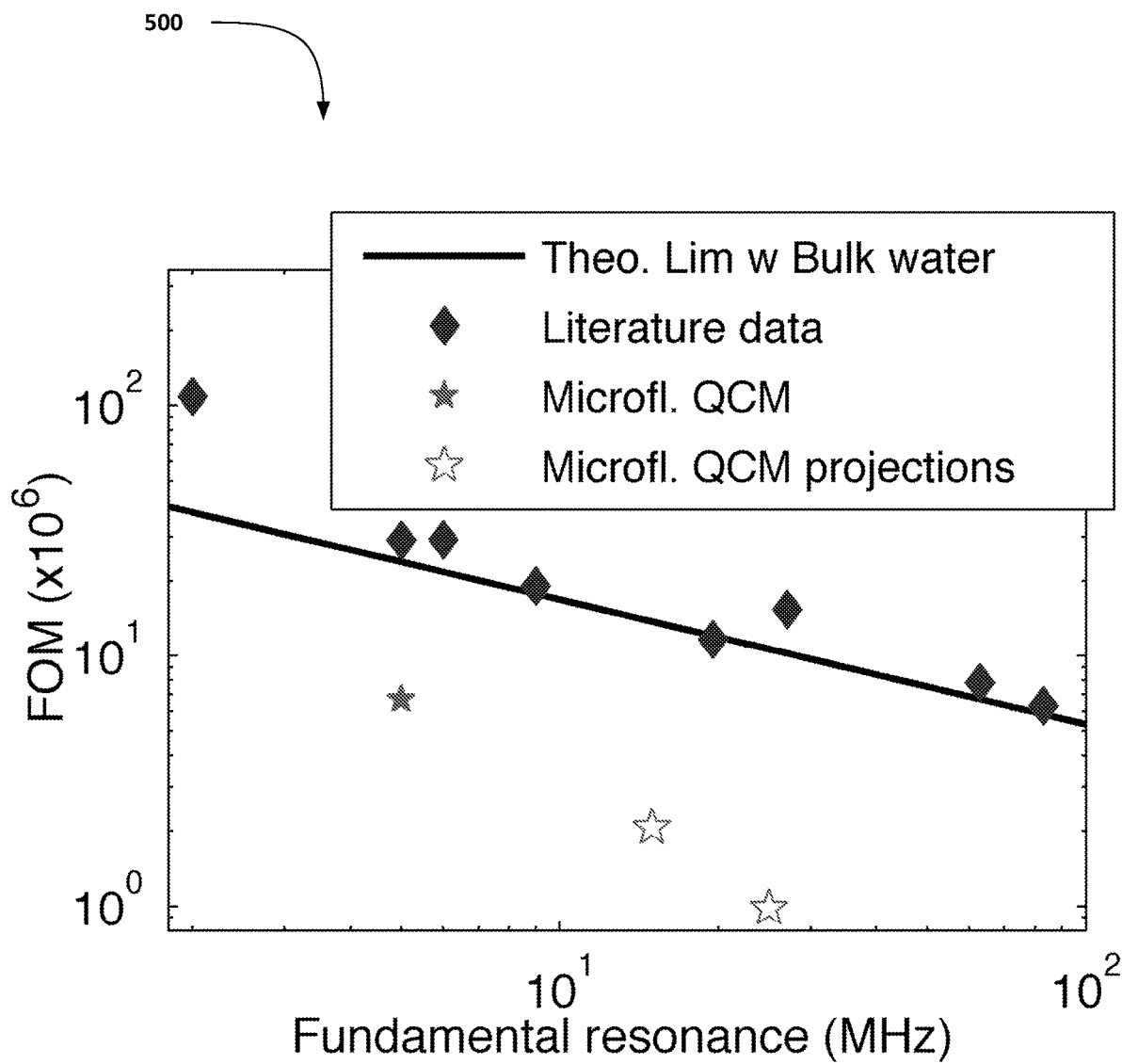
FIG. 5 shows a comparison plot of the figures of merit of the characterization device in accordance with embodiments of the present disclosure versus literature devices.

FIG. 5 shows a comparison plot 500 of the figure of merit (FOM) of the characterization device 100 in accordance with embodiments of the present disclosure versus other devices in literature. The figure of merit (FOM) for the sensor platform, such as the resonance sensing based mass sensors used in the present disclosure, is defined as:

$$FOM = \frac{f_0}{Q \cdot s},$$

where $f_0$ is the fundamental resonance frequency (which depends on the thickness of the sensor platform), Q is the quality factor [Q=1/Dissipation (D)], and s is the mass sensitivity. In an example, the AT-cut quartz crystals that can be used in the conventional quartz crystal microbalance (QCM), which can be a sample sensor platform, has an s value of $2.26 \times 10^{-6} f_0^2$ cm² Hz/g. When the QCM is exposed to a liquid during a measurement of analytes, the viscosity and the density of the liquid medium can cause the QCM to have a lower Q-factor than compared to when it is in gaseous/vacuum environments. For example, the Q-factor of a 10 MHz QCM's crystal decreases from 20,000 to 2,000 when exposed to water, which entails a 10 fold FOM increase, signifying that the mass resolution decreases. The Q-factor is a unitless value and decreases to 2,000 because one side of the QCM crystal faces the liquid medium, such as, for example, water.

Still referring to FIG. 5, a lower FOM denotes a higher mass resolution in the sensor platform, such as a conventional thickness shear mode resonators (TSRs). One example technique to achieve this is through the use of thinner TSRs with higher $f_0$. Such miniaturized, conventional resonators are highly sensitive mass sensors in gaseous/vacuum environments. A conventional TSR with an x times higher $f_0$ in vacuum/gaseous environments can improve the FOM x times. However, the Q-factor scales with $f_0^{1/2}$ in liquid and thus decreases by $\sqrt{x}$ times. As a result, the FOM of a conventional TSR can only improve $\sqrt{x}$ times in a liquid sample or medium.

Still referring to FIG. 5, the characterization device 100 in the present disclosure combats the issue of a lower Q-factor in liquid sensing by integrating solid micro/nanofluidic channels 102 that can be attached 312 onto, in an example, TSR based mass sensors serving as the sensor platform. This allows the maintenance of high Q-factors while measuring analytes in a liquid sample. The same principle can be applied to other sensor platforms, such as shear SAW devices, reducing the damping of the device and enabling operation at high frequencies to be more sensitive. As previously mentioned, a plurality of covered micro/nanofluidic channels 102 can be placed in a perpendicular orientation to the direction of the main shear motion of the resonator surface so that liquid sample is trapped within the channels 102 and thus moves in the direction of the shear motion. Since the liquid is trapped between the solid channel walls, it does not cause viscous damping as typically occurs when bulk liquid faces the resonator surface, i.e. the trapped liquid now acts more like a solid than a liquid. Furthermore, the characterization device 100 can operate in vacuum or in air, where it naturally has a low dissipation and high-Q-factor. As such, the confinement of the liquid medium to thin covered channels 102 that are coupled rigidly to the surface of a sensor platform, such as a shear wave based sensor, greatly diminishes fluid damping effects since the liquid is now rigidly coupled to the sensor surface. This enables mass sensing measurements in liquid environments with a sensitivity of that in air or vacuum environments, which has low damping and high Q-factor. That is, the characterization device 100 has similar low damping and high Q-factor metrics as a conventional device operating in an ideal environment such as in air or in vacuum. Hence, by trapping the liquid sample inside the fluidic channels 102 as a coupled mass, the Q-factor can be improved and this consequently improves the minimum detectable mass of the sensor platform in liquid environments by at least an order of magnitude. In an example experiment of the characterization device 100 that comprises microfluidic channels 102 attached 312 to a quartz crystal microbalance (QCM), a 6× improvement in Q-factor was demonstrated, translating to a 6× improvement in mass resolution for the characterization device 100.

Still referring to FIG. 5, the integration of microfluidic channels 102 with a sensor platform, such as a TSR, enables the use of this technology for point-of-care (POC) detection of biomarkers and other situations where analyte volume is limiting. In the previously mentioned example experiment of the characterization device 100 that comprised microfluidic channels 102 attached 312 to a QCM, only 14 nL of the liquid sample was used to make measurements, while a conventional QCM device uses several milliliters. Furthermore, since the characterization device 100 is highly sensitive to mass, the specific and unspecific binding of analytes can also be measured. This paves the way for applications in diagnostic devices, such as, for example, immunosensors.

Still referring to FIG. 5, the comparison plot 500 shows the figure-of-merit (FOM) plotted as a function of resonance frequency for QCM measurements in water. The black line shows the theoretical limit of FOM, the blue diamonds show the conventional QCM crystals at different fundamental resonant frequencies, and the filled red stars show, in an example, water filled microfluidic channels 102 attached 312 to a QCM as disclosed in the present disclosure. The expected FOMs for the microfluidic channels 102 attached 312 to a QCM with fundamental resonance frequencies of 15 MHz and 25 MHz using the current dissipation results were also calculated. Basically, the black line represents the theoretical FOM limit for conventional devices, where it can be seen that the literature data (represented by the blue diamonds) has devices that are meeting this theoretical limit. The present disclosure shows that, in the example experiment mentioned above, the characterization device 100 currently shows better sensitivity and FOM than the theoretical limit and literature devices. This is shown by the filled red star. Projections of the characterization device 100 into the future based on additional experiments are represented by the unfilled red stars. The comparison plot 500 shows that the present and future performance of the characterization device 100 can exceed the theoretical FOM limit of conventional devices.

Still referring to FIG. 5, it is apparent from the FOM equation above that the FOM correlates with the minimum detectable mass and therefore a lower FOM represents a better mass sensor device. To demonstrate the order of magnitude improvement in FOM achieved by characterization device 100 compared with that of conventional QCM devices at the same fundamental frequency, the comparison plot 500 was generated showing the FOMs of QCMs with different fundamental frequencies and the FOM of the characterization device 100, which comprises, in an example, microfluidic channels 102 attached 312 to a QCM. Measurements were made in DI water.

Still referring to FIG. 5, a computation was also made of the lowest FOM achievable when a polished QCM surface faces water. The comparison plot 500 shows that the literature data approach this theoretical FOM limit in most cases. The characterization device 100, however, surpasses this theoretical limit (at this given fundamental frequency) and yields a FOM value more than 5× better than that of a conventional QCM. Simulations of the characterization device 100 operating at higher fundamental resonance frequencies, as represented by the unfilled red stars, show that even without improving the microfluidic channel 102 design, the improvement in the FOM will be significant. Thus, it is reasonable that improvements on the microfluidic channel 102 design of the characterization device 100 may obtain a FOM that can exceed an order of magnitude improvement compared to conventional QCMs.

Figure 6:
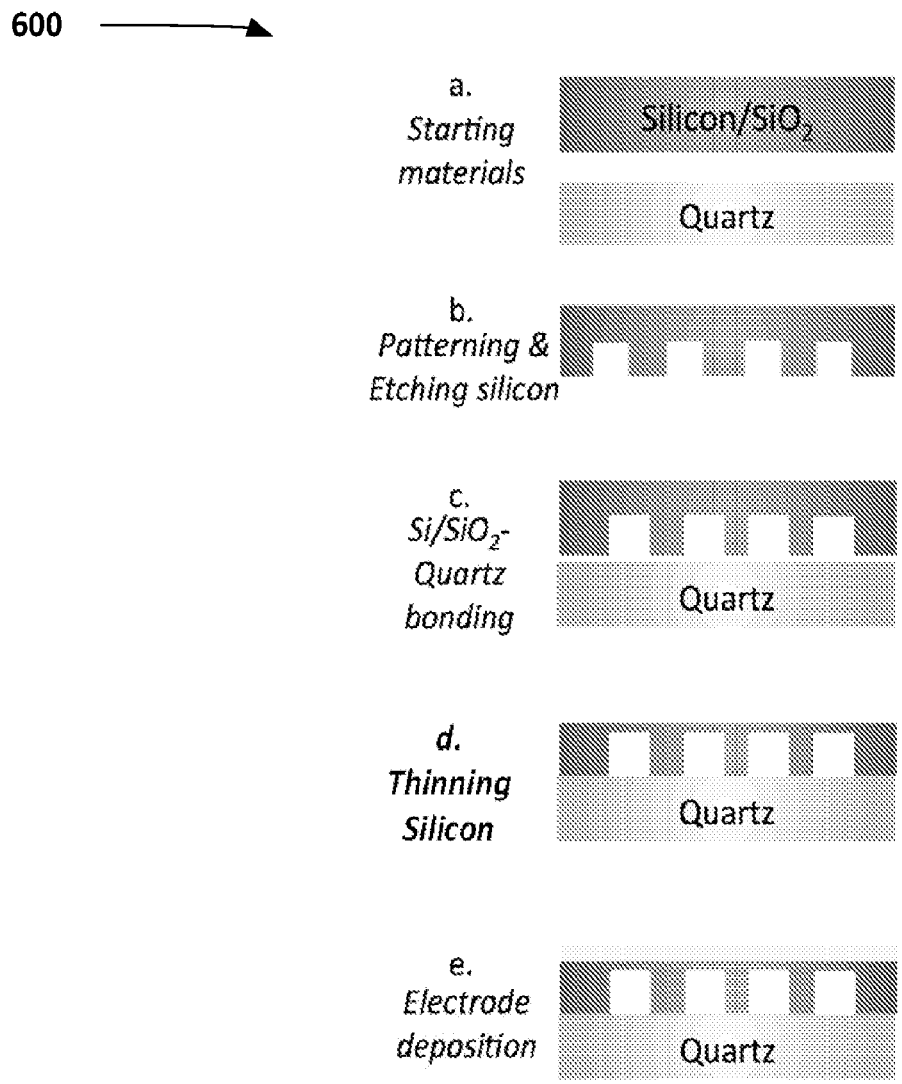
FIG. 6 shows an example silicon/silicon dioxide bonding process in accordance with embodiments of the present disclosure.

FIG. 6 shows an example silicon/silicon dioxide bonding 600 process in accordance with embodiments of the present disclosure for fabricating 300 the characterization device 100. Step (a) begins with the starting materials that are, in an example, silicon/silicon dioxide that can be used to make the fluidic channels 102 and a sensor platform that can be, in an example, made of quartz, such as a QCM. Aside from the silicon and silicon dioxide, the materials can comprise a composition of at least one of silicon, silicon dioxide, aluminum, gold, titanium, titanium/aluminum, chromium, and a stiff polymer.

Still referring to FIG. 6, step (b) shows that the silicon/silicon dioxide material can be patterned using, in an example, photoresist to create the fluidic channels 102. The silicon/silicon dioxide can then be etched to realize the channels 102. The template for the channels 102 can be created by resistive ion etching (RIE) or wet-etching of the silicon or silicon dioxide substrate.

Still referring to FIG. 6, step (c) shows the quartz bonding of the channels 102 onto the sensor platform. That is, the adhesion mechanism 310 can comprise the silicon dioxide between the fluidic channels 102 and the sensor platform. The adhesion mechanism 310 is used to attach 312 the fluidic channels 102 to the sensor platform. The bonding in step (c) can be done using, in an example, chemical pretreatment of the surfaces and applying pressure and temperature to the surfaces.

Still referring to FIG. 6, step (d) shows that the fluidic channels 102 comprised of silicon in this example are thinned down at the top. The thinning can occur by wet or dry etching. Step (e) shows the deposition of electrodes that are comprised of, in an example, gold on top of the fluidic channels 102. The electrode can be deposited onto the bonded substrate.

Figure 7:
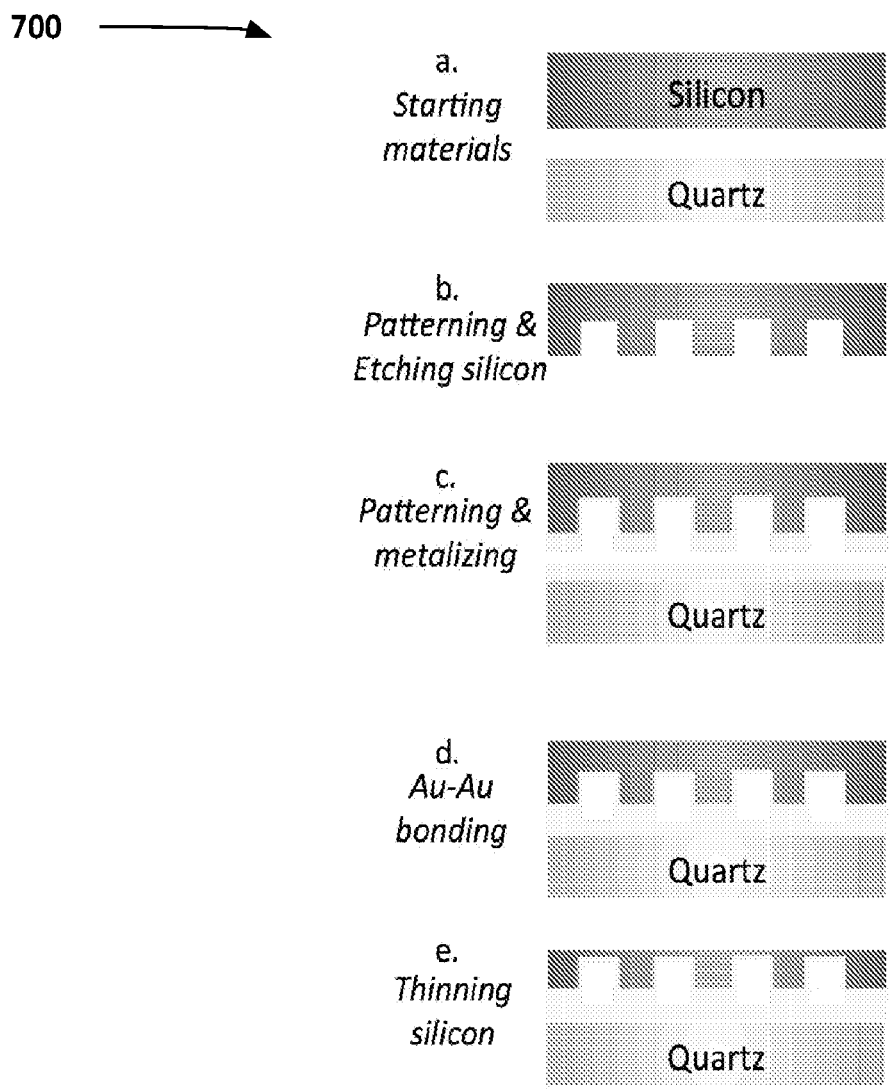
FIG. 7 shows an example gold/gold thermocompression process in accordance with embodiments of the present disclosure.

FIG. 7 shows an example gold/gold thermocompression 700 process in accordance with embodiments of the present disclosure for fabricating 300 the characterization device 100. Step (a) begins with the starting materials that are, in an example, silicon/silicon dioxide that can be used to make the fluidic channels 102 and a sensor platform that can be, in an example, made of quartz, such as a QCM. Aside from the silicon and silicon dioxide, materials can comprise a composition of at least one of silicon, silicon dioxide, aluminum, gold, titanium, titanium/aluminum, chromium, and a stiff polymer.

Still referring to FIG. 7, step (b) shows that the silicon material can be patterned using, in an example, photoresist to create the fluidic channels 102. The silicon can then be etched to realize the channels 102. The template for the channels 102 can be created by resistive ion etching (RIE) or wet-etching of silicon or silicon dioxide substrate.

Still referring to FIG. 7, step (c) shows the patterning and metalizing of the fluidic channels 102 and the sensor platform. In an example, a titanium (Ti)/gold (Au) layer can be deposited. Step (d) shows the Au—Au bonding wherein the gold regions can be deposited onto the silicon template. The gold coated silicon channel template can then be bonded to the gold electrode of the piezoelectric sensor platform by thermocompression. Step (e) shows that the fluidic channels 102 comprised of silicon in this example are thinned down at the top to a desired thickness. The thinning can occur by plasma or dry etching.

Referring to FIGS. 6 and 7, the choice of silicon as a material in these examples for the channels has several advantages: (1) it is stiff; (2) it can be patterned to desired channel depths and widths without risk of mechanical instability; and (3) the gold coating makes it amenable to thermocompression bonding and subsequent surface functionalization using thiol-gold chemistry. In an example, self-assembled monolayers can be applied to the gold surfaces before bonding, which has been shown to reduce the required bonding temperature, which is beneficial in the fabrication 300 process.

Figure 8:
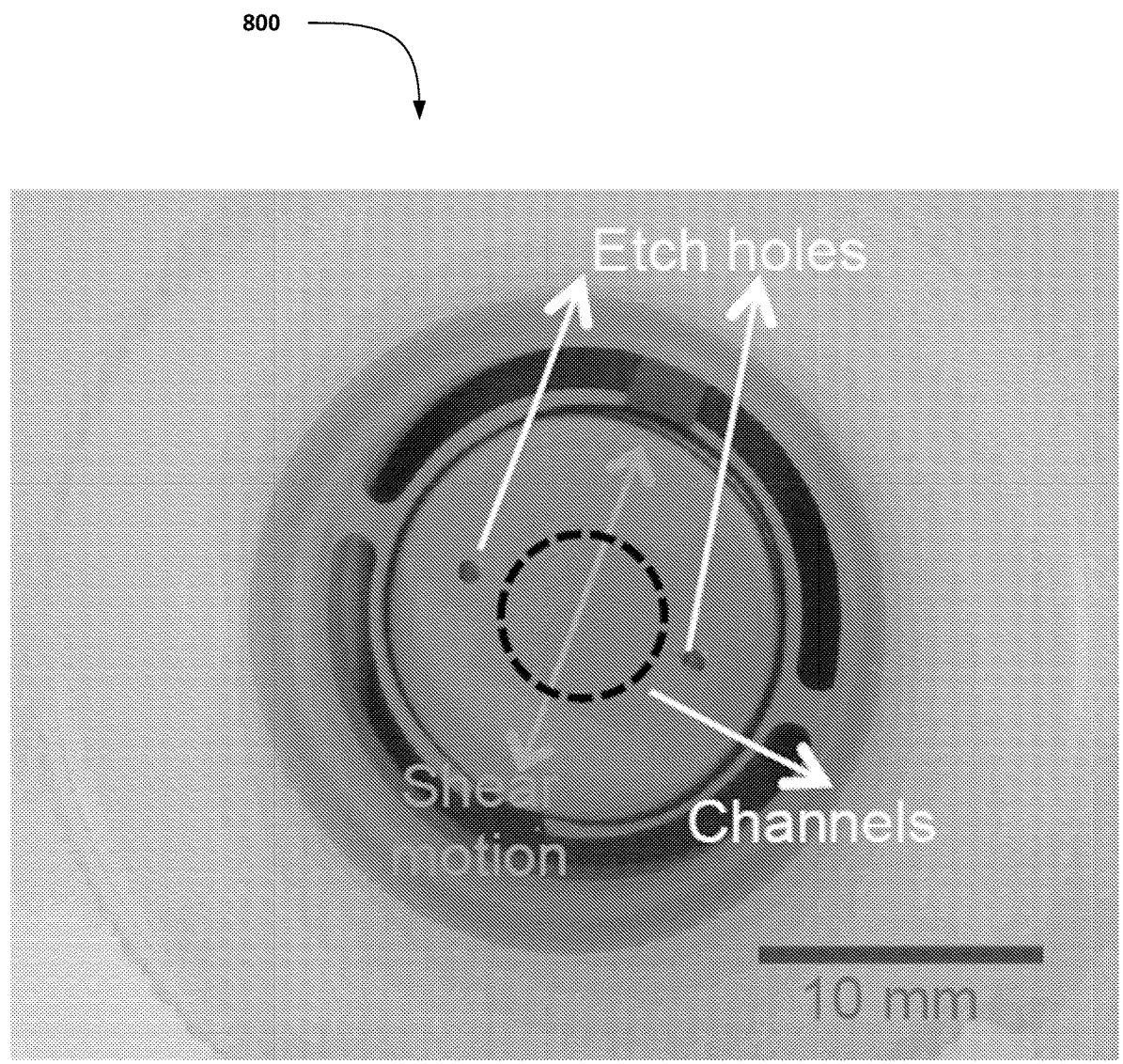
FIG. 8 shows an example of the characterization device in accordance with embodiments of the present disclosure.

FIG. 8 shows an example of the characterization device 100 in a holder 800 in accordance with embodiments of the present disclosure. The device 100 can be placed in, in an example, a QCM200 holder 800 made by Stanford Research Systems Inc. and connected to, in an example, a QCM-D controller made by Biolin Scientific Inc. The resonance frequencies and dissipation of the crystal are recorded before fabrication 300, after fabrication 300, and after dissolving the photoresist. Measurements before and after fabrication 300 show that the resonance frequencies of the QCM chips are reduced due to the mass loading of, in an example, the aluminum covered channels 102, and that the presence of the channels 102 does not create any additional dissipation at the fundamental resonance mode and at higher modes.

Still referring to FIG. 8, the fluidic channels 102 can be filled, in an example, by capillary action. A small drop (~1 µL) of liquid can be placed onto one of the etch holes 800 (i.e. the inlet cavity) while the other hole 800 (i.e. the outlet cavity) is open. The liquid is drawn into the channels 102 by capillary action and wets the channels 102. Once the liquid reaches the outlet cavity, it evaporates there and thus more liquid is drawn into the channels 102, with the liquid drop at the inlet cavity acting as a reservoir. To introduce new liquids, the drop is aspirated with a pipette and replaced with a drop of the desired liquid sample. With the evaporation of the liquid at the outlet cavity, new liquid can move into the channels 102. The total volume needed to fill the channels 102 in the present disclosure is, in an example, 14 nL. This is orders of magnitude less when compared to the milliliters of liquid required for conventional QCM devices.

Still referring to FIG. 8, a comparison between the normalized frequency shifts of conventional QCM devices and the characterization device 100 show: (1) the difference in the trend of normalized frequency shifts with respect to the mode numbers. For higher mode numbers, the normalized frequency shifts decrease for the polished crystal while they increase for the characterization device 100, which can be, in an example, microfluidic channels 102 attached 312 to a QCM. (2) The characterization device 100 shows higher frequency shifts for all modes. These two observations can be explained by the differences in the interaction of shear waves with the liquid and solid layers due to the microfluidic channels 102. The normalization is done using the mode number of the resonance frequency shifts of the two devices.

Still referring to FIG. 8, when the polished surface of a conventional resonating QCM crystal faces bulk liquid, it causes a plane-parallel laminar flow of the liquid close to the crystal surface. The amplitude of this viscously-coupled flow, which moves with a phase lag with respect to the surface, decays rapidly with larger distance from the crystal surface into the liquid. At higher frequencies, the decay length of this motion decreases, and as a result, less liquid is coupled to the surface. Since the normalized frequency shifts are directly proportional to the amount of coupled liquid, they decrease for higher modes. However, for the characterization device 100, the water inside the channels 102 moves in unison with the solid channel walls and the sensor platform's surface, thus the amount of rigidly coupled liquid inside the channels 102 does not decrease at higher modes and therefore, the normalized resonance frequency shifts are not reduced. The higher resonance frequency shifts in the characterization device 100 compared to those observed for the polished conventional QCM indicate that a larger amount of water is moving with the fluidic channels 102. This is because the amount of water trapped inside the microfluidic channels 102, which covers only a small part of the crystal surface of the sensor platform (in an example, $\sim 1/6^{th}$), is larger than the amount (i.e. volume) that is accessible to the decay length on a polished conventional QCM. While the amount of rigidly-coupled liquid does not change with higher frequency modes in the characterization device 100, the resonance frequency shifts increase with higher modes. This is due to the complex behavior of shear waves in a layered structure, i.e. a rigidly coupled liquid layer lies underneath a solid aluminum layer of the characterization device 100. This result is also apparent in transmission line theory calculations that model the impedance of the layered materials. So while the Q-factors, which are the inverse of total dissipation, of the polished conventional QCMs are high during air/vacuum measurements, they are reduced with liquid contact because of the dissipation caused by the viscously-coupled liquid. Furthermore, the dissipation shifts for a polished conventional QCM is reduced at higher modes due to less liquid being viscously-coupled to the QCM's crystal surface at higher frequencies. In contrast, the characterization device 100, which moves higher volumes of liquid compared to the polished conventional QCM and shows overall higher frequency shifts, has at least an order of magnitude less dissipation shifts for all modes. This again is because in the characterization device 100, the liquid inside the microfluidic channels 102 is rigidly-coupled to the surface and therefore moves in-phase with the motion of the surface, minimizing viscous drag.

Still referring to FIG. 8, the resonance frequency and dissipation shifts in the characterization device 100 in response to liquid exposure demonstrate that the liquid measured in the characterization device 100 is perceived by the sensor platform as a rigidly-coupled material rather than a liquid and thus does not cause viscous damping of the sensor platform. These results show that liquids trapped in microfluidic channels 102 can act as though they are rigidly coupled to the sensor platform during shear wave motion, thus increasing the mass resolution of the sensor platform. For a polished conventional QCM, both the density and viscosity of the liquid in contact with the resonator's surface affect the resonance behavior of the polished conventional QCM's crystals. As the product of these two material properties increases, the decay length also increases. In contrast, the volume of liquid moving with the shear motion of the characterization device 100 does not change for different liquids. Therefore only the mass, and consequently also the density, of the trapped liquid affect the resonance of the characterization device 100. This allows changes in liquid density to be detected with high sensitivity by the characterization device 100.

Still referring to FIG. 8, to demonstrate the characterization device's 100 ability to detect density changes in liquids, an experiment was performed wherein DI water and mixtures of ethanol and water (10%, 20%, and 30% ethanol by weight) were introduced to the inlet cavity etch holes 800. As a control and for comparison purposes, a polished conventional QCM crystal with identical size was used to measure its response after exposure to the same mixtures as the characterization device 100. The density and viscosity of these mixtures are given in Table 3, which shows that the density decreases and the product of density and viscosity increases with higher ethanol concentrations used in this experiment.

Figure 14A:
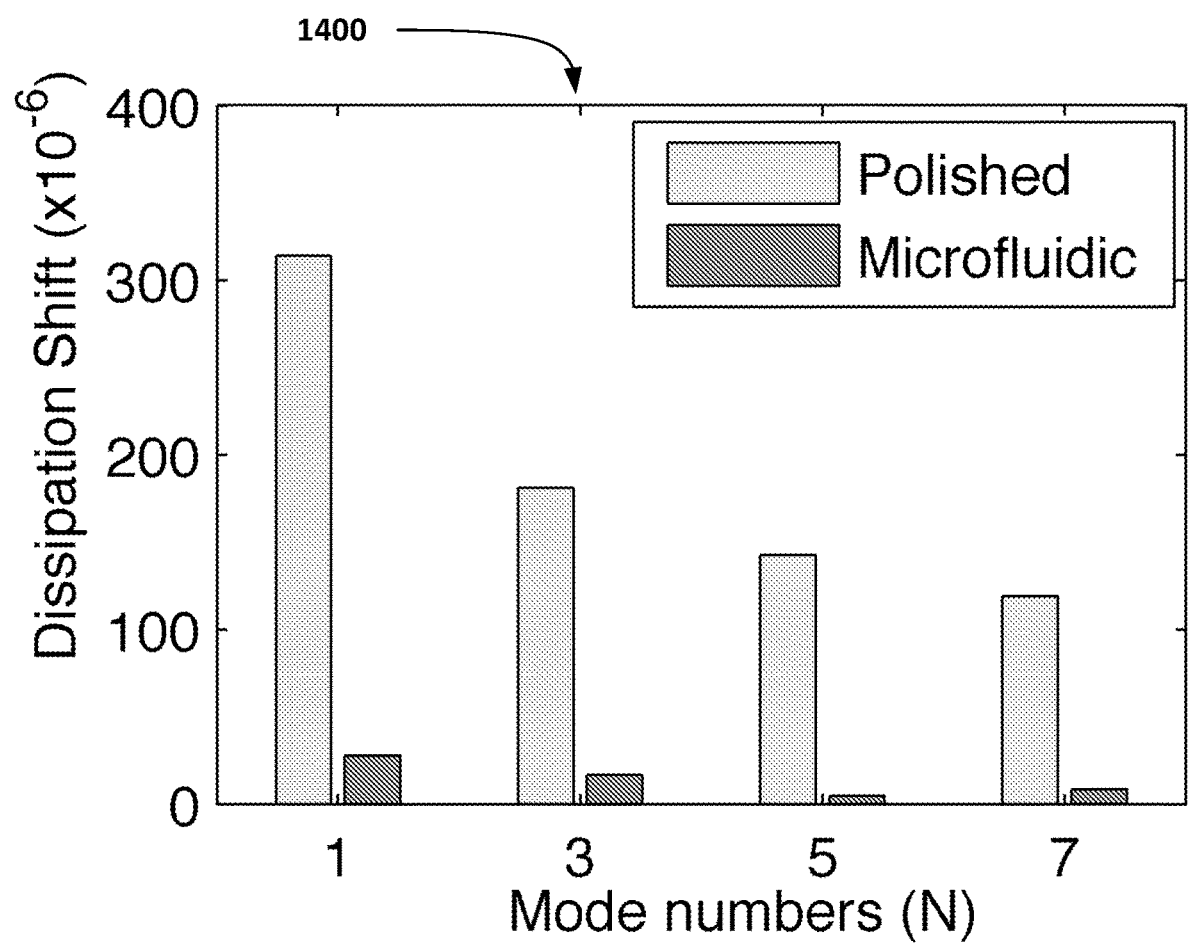
FIG. 14A and FIG. 14B show example plots comparing the respective harmonic number normalized frequency shifts and dissipation increase of the characterization device with that of the conventional quartz crystal microbalance sensors.
Figure 14B:
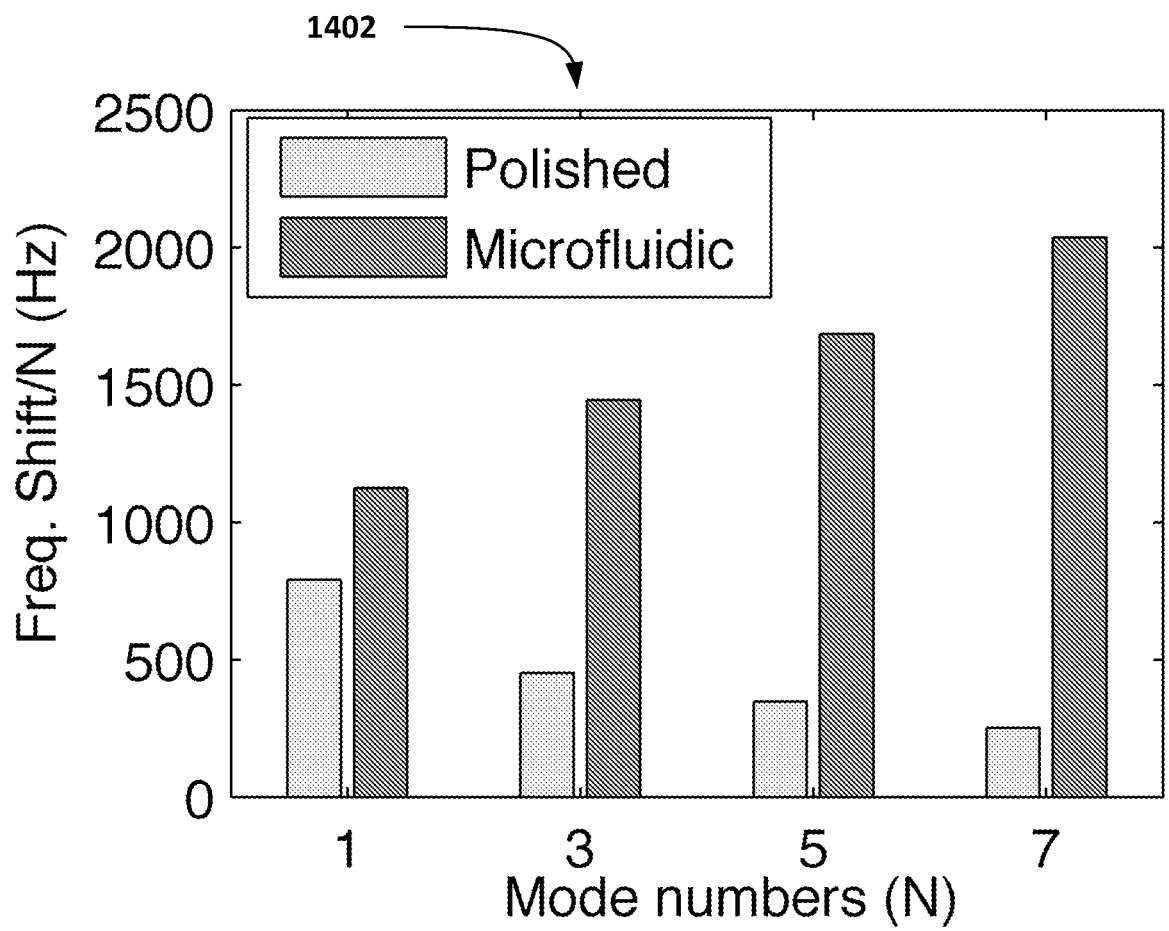

The resonance frequency and dissipation shifts for the $7^{th}$ resonance mode (chosen to maximize frequency shifts) show that because the density decreases for higher ethanol concentrations, the liquid trapped in the channels 102 of the characterization device 100 has less mass, and consequently, the resonance frequency increases for higher ethanol concentrations. In contrast, for the polished conventional QCM, the density-viscosity product of the solutions increases with higher ethanol concentrations, which reduces the resonance frequency of the polished crystal. This difference in resonance frequency shifts for the same mixtures demonstrate that the characterization device 100 solely reacts to density changes of the liquid, denoting that the characterization device 100 can be used for low volume sensing of small changes in liquid density. Indeed, the dissipation shifts, referenced to the DI water values, show a shift of $74 \times 10^{-6}$ for the characterization device 100 and $173 \times 10^{-6}$ for the polished crystal. With the introduction of the ethanol mixtures, the dissipation in the characterization device 100 increases slightly, with the largest shift for the 30% ethanol mixture, i.e. around $5 \times 10^{-6}$. On the other hand, the polished conventional QCM shows an order of magnitude higher dissipation for the same mixture. Thus, the characterization device 100 is superior to the polished conventional QCM in terms of maintaining low dissipation, i.e. high Q-factors, for all of the mixtures used in this experiment. Tables 1 and 2 below summarize the results. While this experiment was performed using ethanol/water mixtures, similar results can occur for particles and bioanalyte samples as well since they can also change the total mass inside the microfluidic channels 102 and thus, can also be detected by the characterization device 100. For instance, it is possible to cover the internal surface of microfluidic channels 102 with antibodies specific to certain biomolecules. As a result, when a liquid with a variety of particles are introduced into the channels 102, the targeted molecules will bind to the antibodies while the other molecules can be flushed out via the outlet cavity etch hole 800. FIG. 14A and FIG. 14B, as described below, plots the results as shown in the tables.

TABLE 1

In the 1st column, Q-factor of a characterization device 100 in air is shown. Then, water is introduced to the microfluidic channels 102. The resonance frequency shifts and the Q-factors with water are shown in the above columns.

| N = mode number | Q-factor with empty channels | Freq. shift/N with water filled channels | Q-factor with water filled channels |
|---|---|---|---|
| 1st mode | 20576 | 1124 | 13159 |
| 3rd mode | 62771 | 1444 | 30730 |
| 5th mode | 35996 | 1685 | 31083 |
| 7th mode | 16932 | 2036 | 14787 |

TABLE 2

In the 1st column, Q-factor of a polished conventional QCM crystal in air is shown. Then, water is introduced to the crystal's surface. The resonance frequency shifts and the Q-factors with water are shown in the above columns.

| N = mode number | Q-factor of a polished crystal in air | Freq. shift/N of a polished crystal in bulk water | Q-factor of a polished crystal in bulk water |
|---|---|---|---|
| 1st mode | 17590 | 791 | 2697 |
| 3rd mode | 68465 | 450 | 5108 |
| 5th mode | 67349 | 348 | 6353 |
| 7th mode | 18508 | 252 | 5778 |

TABLE 3

Density and viscosity of ethanol solutions

| | Density ρ (g/cm³) | Viscosity η (mPas) |
|---|---|---|
| DI water | 1 | 0.89 |
| 10% eth. | 0.984 | 1.35 |
| 20% eth. | 0.970 | 1.86 |
| 30% eth. | 0.955 | 2.29 |

Still referring to FIG. 8, micro/nanofluidic channels 102 can be built from solid walls with a direction perpendicular to the shear wave motion on the sensor platform, such as a TSR or shear wave SAW device. As shown in FIG. 8, the channels 102 can be in a perpendicular orientation from the shear motion 800 of the sensor platform. The sensing of the characterization device 100 is performed in, in an example, a 6.5 mm diameter circular region active area, as indicated by the dashed circular line. In an example, 213 fluidic channels 102 were placed in the characterization device 100. The dimensions of the microfluidic channels 102 can be designed and optimized for the operation frequency, i.e. the thickness of the solid wall should be significantly smaller than the shear wavelength inside the solid wall material. The material can comprise a composition of at least one of silicon, silicon dioxide, aluminum, gold, titanium, titanium/aluminum, chromium, and a stiff polymer. For sensor platforms such as TSRs and shear wave SAW devices that perform at high frequencies and small wavelengths (like shear-FBARs), smaller channels like nanofluidic channels 102, which has smaller wall thicknesses and channel widths, are more appropriate. For trapping the liquid inside the channels 102, materials with high elastic modulus should be used. Since the measurement media is contained inside the micro/nanofluidic channels 102, the rest of the sensor platform, such as the shear wave transducer, can be operated in vacuum for superior Q-factors and performance.

Likewise, for sensor platforms such as shear wave SAW devices, it is possible to use waveguides that enhance the performance. The microfluidic channels 102 can be embedded in these waveguides and the rest of the device can be operated in vacuum (or in air) for superior Q-factors. A characterization device 100 on a shear wave SAW sensor platform can be used to detect changes in the liquid density or presence of adsorbed material with high mass resolution.

Similarly, for sensor platforms such as S-FBAR devices, the nanofluidic channels 102 can be integrated onto one of the platform's surfaces and the media above and underneath the sensor platform can be operated in vacuum for high Q-factors. For S-FBAR devices with acoustic mirrors, the nanofluidic channels 102 can be integrated between the mirrors and the FBAR electrode to detect minor changes in the fluid properties.

Still referring to FIG. 8, yet another example of a sensor platform can be thickness-shear mode quartz resonators wherein the crystal can be an AT-cut of the quartz. The advantages of such resonators are:

Their relatively smaller size when compared with convention quartz crystal microbalances (QCMs).

Their electrodes are soldered to metal connectors and are suspended in air.

Being hermetically packaged to prevent contamination with only the electrode connectors accessible to a user.

Their very stable resonance frequencies which enables relatively small responses to temperature fluctuations and aging.

Their ability to use very thin crystals as quartz resonators at high frequencies, since handling is not a problem after the initial mounting and packaging stages.

Having high Q-factors since these resonators do not suffer from viscoelastic suspensions as much as conventional QCM crystals due to being vacuum-sealed.

Figure 13A:
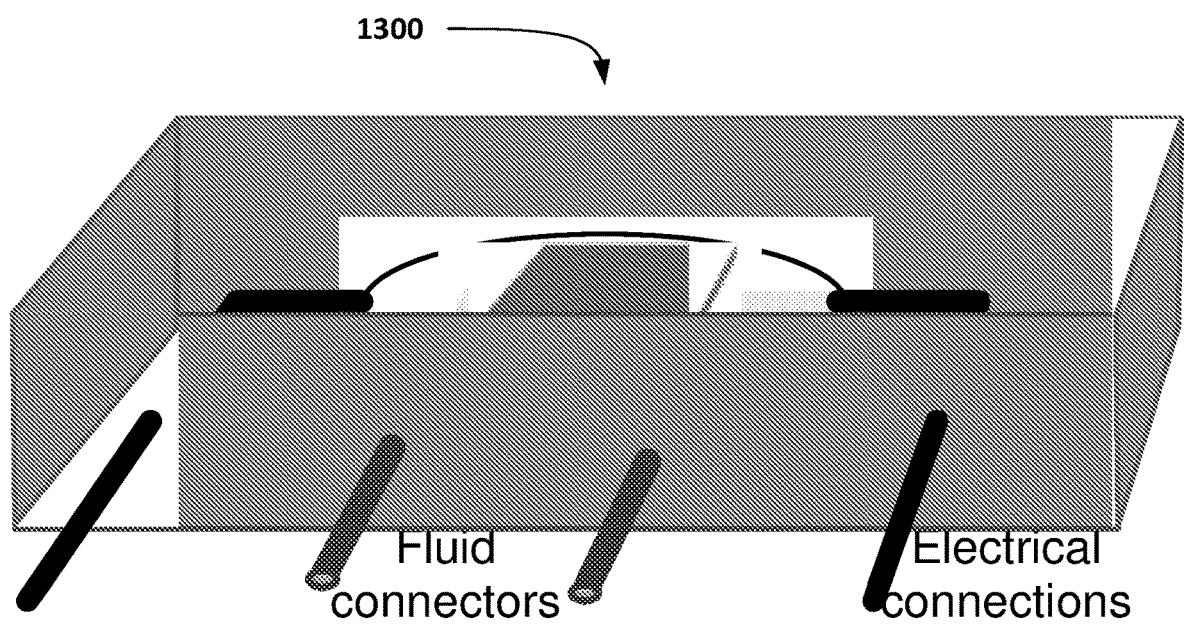
FIG. 13A and FIG. 13B show an example implementation of the characterization device in a circuit and a handheld device in accordance with embodiments of the present disclosure.
Figure 13B:
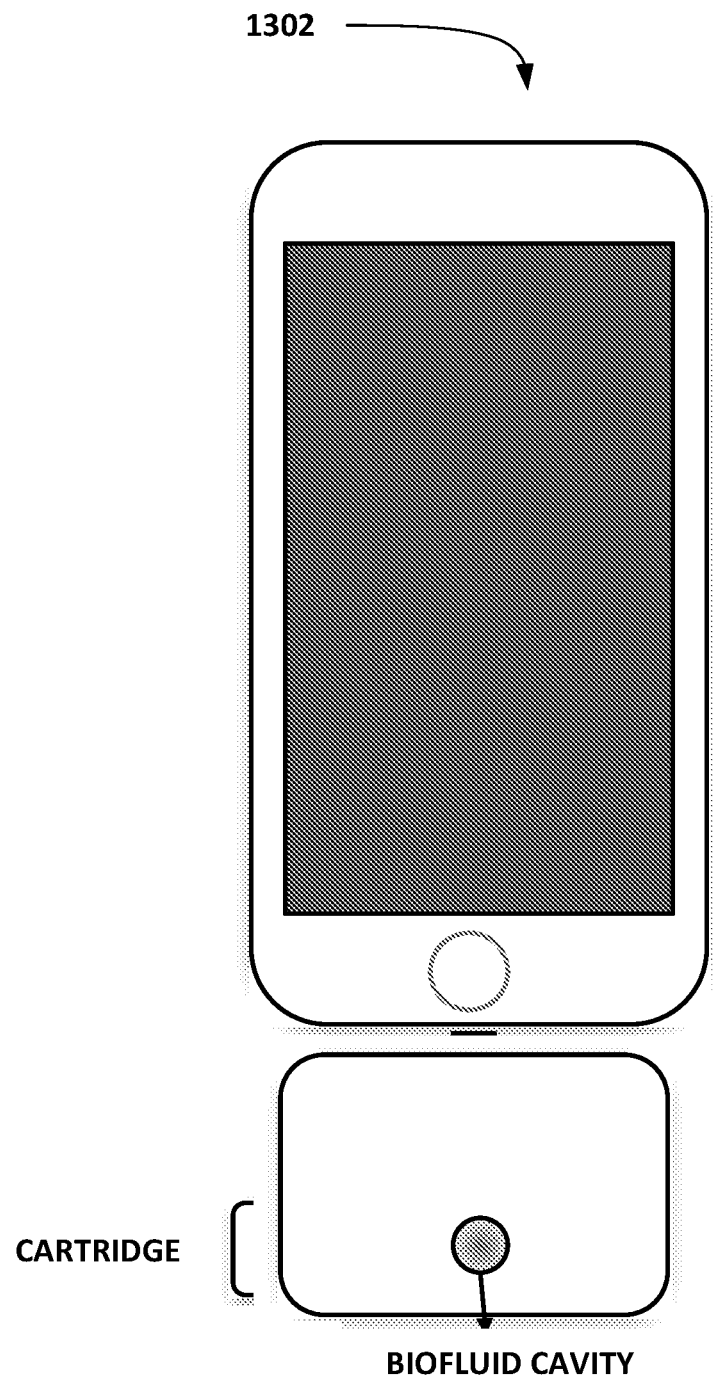

Their ability to interface with very simple oscillator circuits and even be packaged with the circuit, thus enabling the whole crystal/circuit package to have a very small footprint. FIG. 13A and FIG. 13B, as described below, goes into more detail about this.

Not requiring polished surfaces since they operate in hermetically sealed packages.

Lower costs. In an example, a commercial AT-quartz resonator can cost anywhere between $0.05 and $2.00. When the oscillator circuit is packaged with the crystal, it costs between $1 and $50, with the price being dependent on the frequency stability and the complexity of the circuit.

Figure 9:
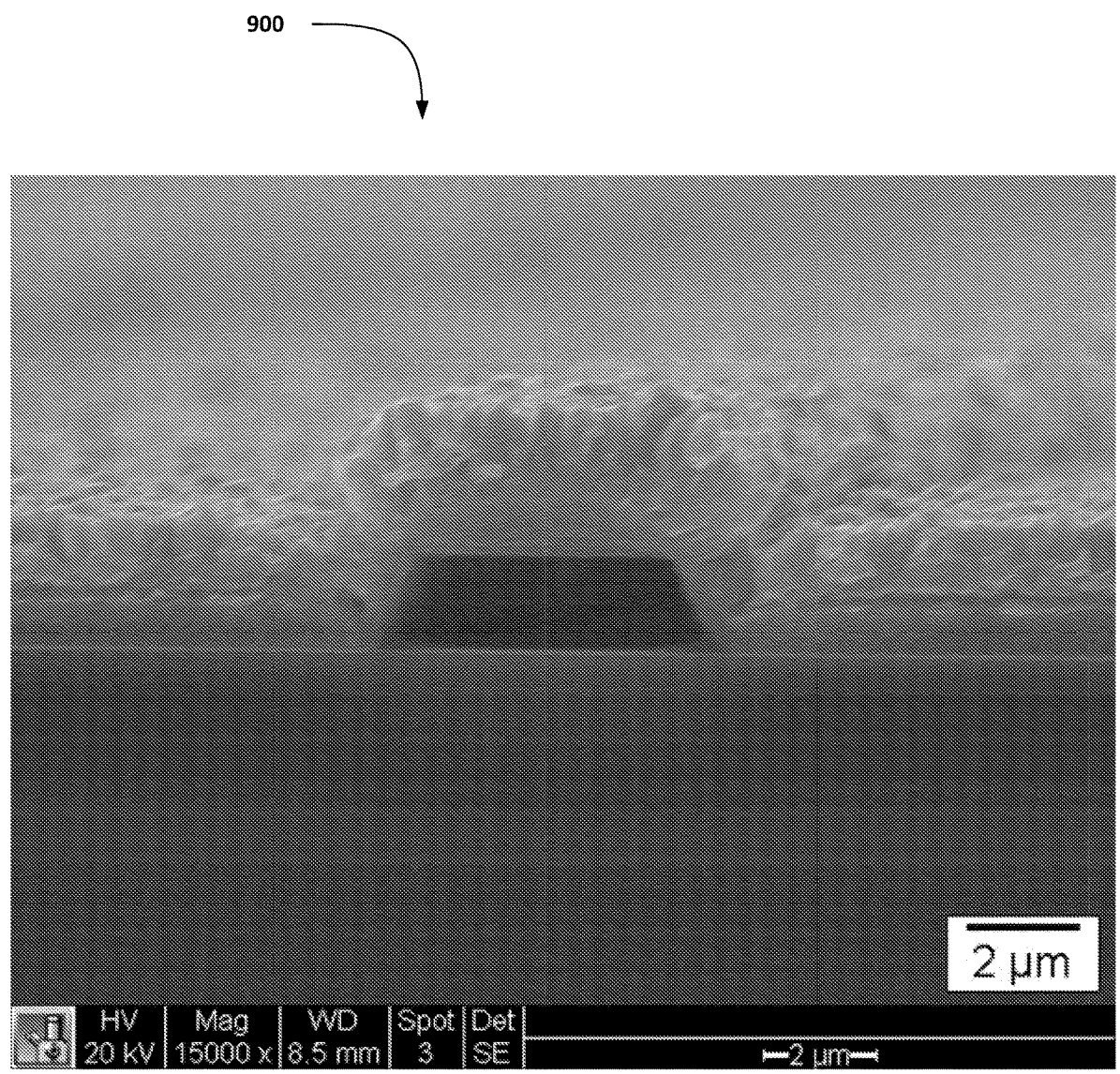
FIG. 9 shows a scanning electron microscope image of an example fluidic channel in accordance with embodiments of the present disclosure.

FIG. 9 shows a scanning electron microscope image 900 of an example fluidic channel 102 in accordance with embodiments of the present disclosure. A single 900 fluidic channel 102 is depicted. The small channel volume can allow for overall miniaturization of the sensor platform, such as a shear wave resonator platform. An improved signal-to-noise (SNR) ratio as a result of operating at a higher frequency can also be obtained. In addition, miniaturization enables incorporation with handheld devices for point-of-care applications, as further described in FIG. 13A and FIG. 13B below. The plurality of microfluidic channels 102 system offers an increase in surface area to volume ratio of the characterization device 100, resulting in benefits such as improved sensitivity to mass sensing and miniaturization possibilities. Furthermore, the fabrication 300 of these microfluidic channels 102 and the assembly of these channels 102 on sensor platform, such as the shear wave sensor platform, can be done using conventional microfabrication techniques known in the semiconductor industry. This reduces fabrication 300 costs associated with making the fluidic channels 102 and the corresponding characterization device 100.

Still referring to FIG. 9, the use of a sensor platform such as the shear wave sensor platform with fluidic channels 102 integrated on top can provide temperature stabilization effects. Conventional shear-wave based mass sensors have to control the temperature of the bulk liquid meticulously and endure long periods of time to attain temperature stabilization. This is because the density-viscosity product of the liquid changes with temperature variations and the measurements are a function of this product. For example, when the water temperature is changed by only 1° C. (at 25° C.), the resonance frequency of a conventional QCM crystal shifts 8 Hz (with $f_0$ at 5 MHz and one side facing the water). The conventional QCM crystal demonstrates a temperature control range of 0.02° C. for this system, which translates into 0.16 Hz measurement variation due to the temperature fluctuations. This value increases when a thinner crystal (or thin-film resonator) is used. For example, a crystal with a 100 MHz fundamental resonance frequency $f_0$ observes a 64 Hz measurement noise when the water temperature varies only by 0.02° C. This temperature induced high frequency fluctuation is a limiting factor for mass sensitivity of conventional devices. In contrast, the present disclosure allows for mass and density measurements inside the microfluidic channels 102. This prevents the measurements from being affected by the fluid viscosity. The rate of change for the density with respect to the temperature is 50× less than the rate of change for the viscosity of water. Therefore, much smaller frequency fluctuations are observed when the characterization device 100 is used. In an experiment involving the characterization device 100 with a sensor platform comprising of an AT-quartz QCM crystal, the frequency fluctuation due to a temperature variation of 0.02° C. was found to be 3 mHz, which is 50× less than the frequency fluctuation in conventional QCM sensors.

Another temperature related benefit of the characterization device 100 is the lower power requirements and less complexity of temperature control systems. To stabilize the temperature in conventional systems, the liquid chamber, the liquid, and the crystal have to be brought to the same temperature. This process is both time and power consuming because of the large volume amount. However, the liquid volume inside the fluidic channels 102 are significantly less than the crystal volume of the sensor platform in the characterization device 100 and thus, the crystal in the characterization device 100 can act as a heat-sink. As a result, the temperature control for the characterization device 100 is easier, cheaper, and faster.

Figure 10:
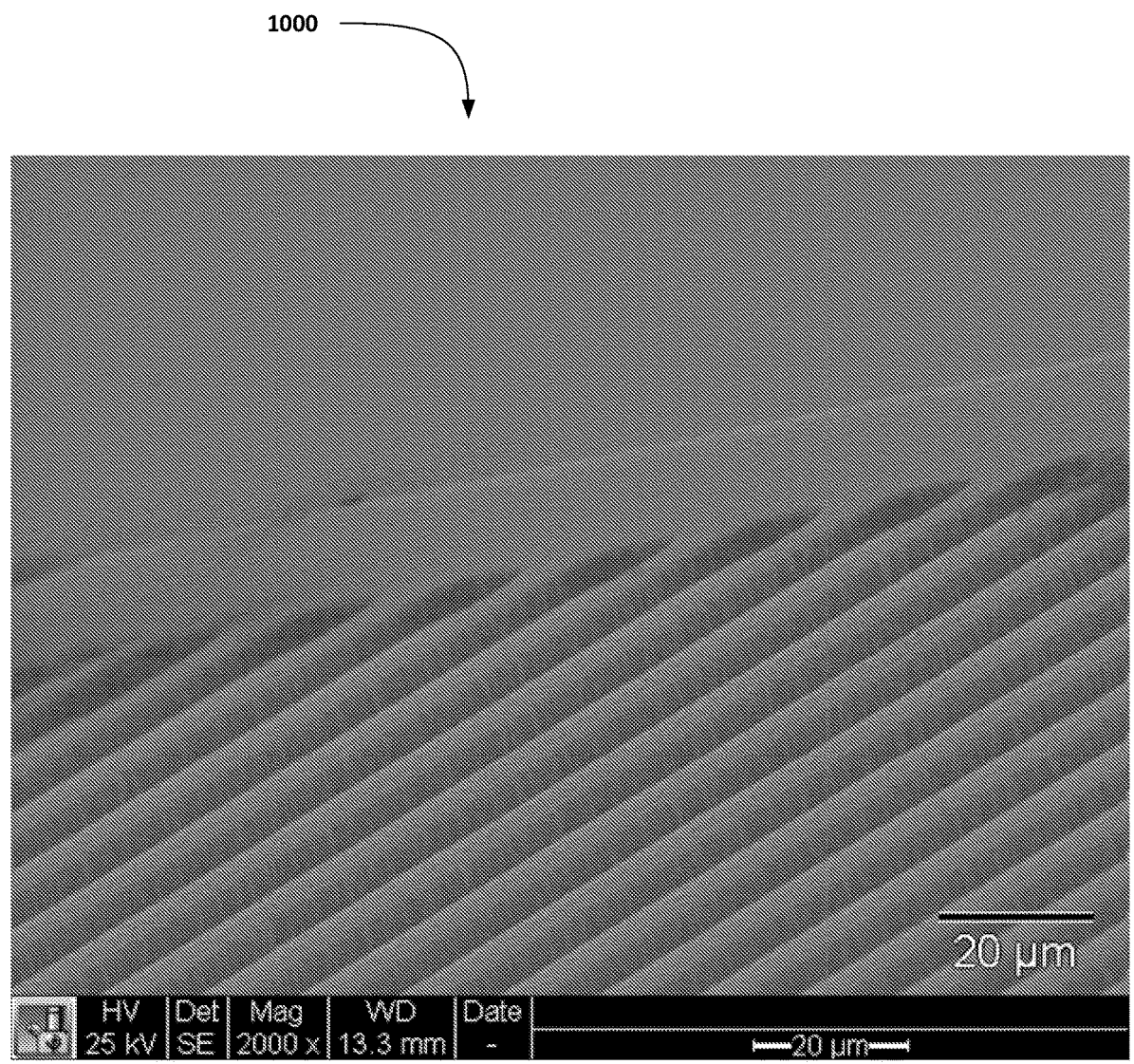
FIG. 10 shows a scanning electron microscope image of the top view of the example fluidic channels in accordance with embodiments of the present disclosure.

FIG. 10 shows a scanning electron microscope image of the top view 1000 of the example fluidic channels 102 in accordance with embodiments of the present disclosure. A plurality of the fluidic channels are depicted, wherein a single 900 channel 102 was shown in FIG. 9. The plurality of fluidic channels 102 are then incorporated in the characterization device 100, as previously shown in FIG. 8 in a holder 800.

Still referring to FIG. 10, the microfluidic channels 102 that can be used in the present disclosure can be microfabricated 300 using known fabrication techniques. These channels 102 have much higher surface area to volume ratio (SA/V) when compared to the conventional shear-mode based sensors and PDMS-based microfluidics. As an example, the characterization device 100 with a sensor platform such as a QCM has 500× higher surface area to volume ratio than a conventional QCM-D sensor. The improved SA/V ratio can help the collection efficiency (α) of particulates in a microsystem, wherein the collection efficiency is expressed as:

$$\alpha = \frac{1}{1 + 1/(SA/V \cdot K \cdot \Gamma_{max})},$$

where K is the adsorption equilibrium constant and $\Gamma_{max}$ is the adsorption site concentration. For small surface area to high volume parameters (as observed in conventional QCM/FBAR/SPR systems), α is small and as a result, only a small portion of the molecules are adsorbed. However, with high SA/V values (as found in the characterization device 100), α approaches unity, i.e. one. An α approaching unity denotes that almost all of the target particulates will be adsorbed in the microfluidic channels 102. This shows that the characterization device 100 only needs very small liquid sample volumes to sense the particulates. Thus, demonstrating high sampling sensitivity and efficiency.

Still referring to FIG. 10, while conventional TSR based mass sensors require polished surfaces, because a rough surface causes faulty measurements at the bulk liquid interface, no such restriction occurs for the characterization device 100. The microfluidic channels 102 in the characterization device 100 can be texturized to increase the surface area. Increasing the surface area increases the solid-liquid interaction, which in turn increases the efficiency of the characterization device 100.

Because the microfluidic component is integral to the characterization device 100, direction and confinement of the fluid to the desired location, i.e., the channels 102 on the sensor platform's surface, is provided. This prevents the complexity and problems related to operating conventional TSRs in fluidic chambers. Thus, much smaller mass sensor devices compared to bulky conventional QCMs can be built using the present disclosure, as it is no longer necessary to isolate one side of the sensor platform.

Figure 11:
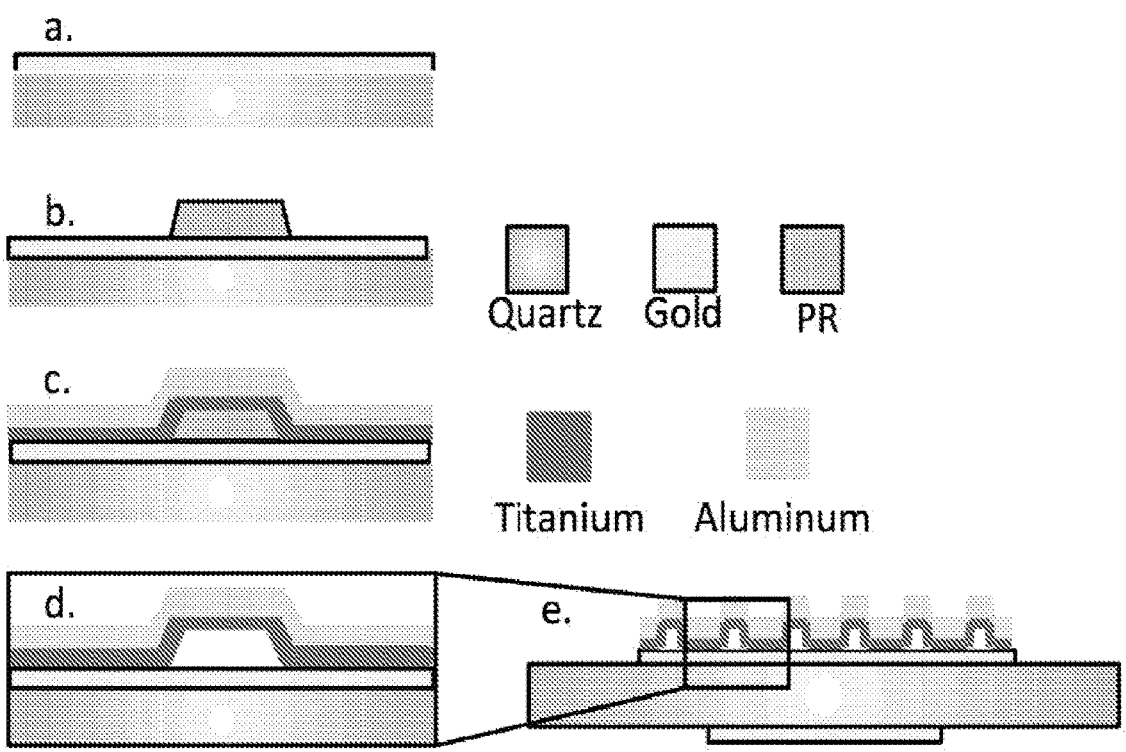
FIG. 11 shows an example fabrication process in accordance with embodiments of the present disclosure.

FIG. 11 shows an example fabrication 300 process 1100 in accordance with embodiments of the present disclosure. The example process 1100 shown can be used to make the fluidic channels 102, as depicted in FIGS. 8-10, on a sensor platform such as a QCM. Step (a) shows the bare quartz crystal with a layer of gold deposited on top. In an example, the bare quartz crystal can be an AT-cut quartz crystal. AT-cut quartz is a piezoelectric material that can be used in such sensor applications. Besides the AT-cut quartz, other piezoelectric films such as ZnO and AlN can be used. While ZnO and AlN are not as frequency stable as the AT-cut quartz with respect to temperature variations, they are easier to deposit and integrate with on-chip electronics. As such, these films provide an alternative means to create a liquid mass-sensor-on-a-chip. Step (b) shows positive photoresist being used to pattern a template for the channels 102 via lithography. Step (c) shows a layer of Ti being deposited first onto the substrate, followed by a deposition of an Al layer. Step (d) shows the results of dissolving the photoresist in order to realize the fluidic channel 102. Step (e) shows that multiple channels 102 can be created on one side of the QCM chip.

Still referring to FIG. 11, fabrication process 1100 of the microfluidic channels 102 on a thickness-shear mode resonators, i.e. the QCM, was done using modified commercial QCM chips. An example of a commercial QCM chip is a 1 inch diameter SRS QCM compatible crystal from Phillip Technologies LLC that can be operable with 5 MHz frequency. Referring back to step (a), the example 5 MHz QCM chips have gold electrodes deposited on top of the bare crystal. Referring back to step (b), a 1.5 µm thick positive photoresist was patterned as the sacrificial layer. The patterned photoresist served as a template for the channels 102, wherein each channel 102 is, in an example, 5-7 µm wide and 6.5 mm long, and spaced 30 µm from the next, parallel channel. Then, the surface can be plasma-cleaned before the deposition of the Ti/Al, as stated in step (c). The amount of Ti deposited in step (c) can be 30 nm and the amount of Al deposited can be 1.45 µm using a DC sputtering system for deposition. After the deposition, etch holes 800 are opened. The etch holes 800 can be seen on the characterization device 100 in FIG. 8. To obtain the final characterization device 100, the structure is placed into, in an example, an acetone bath to dissolve the photoresist so that the fluidic channels 102 can be released, as seen in steps (d) and (e).

Figure 12A:
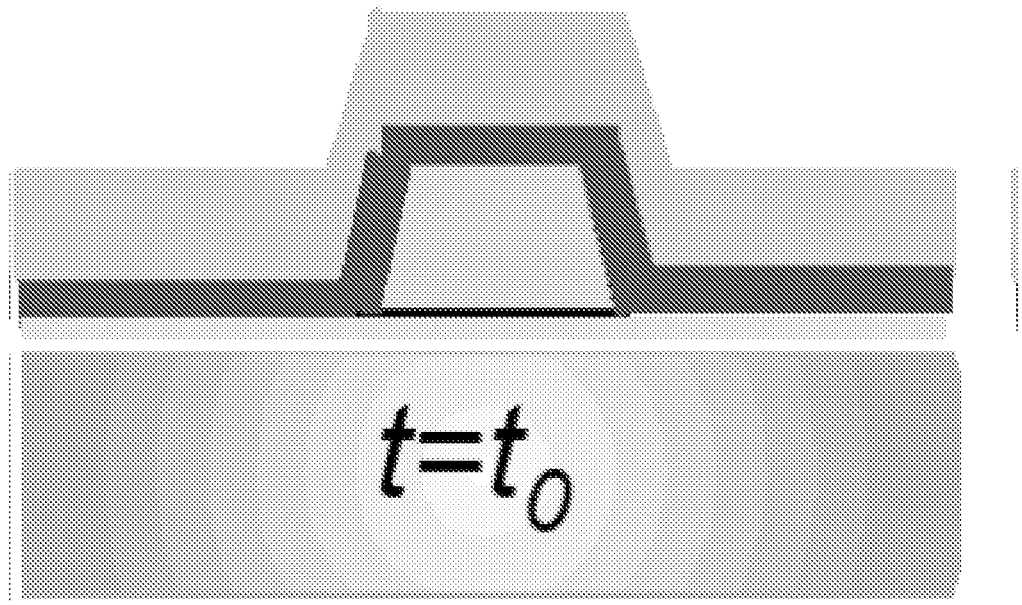
FIG. 12A, FIG. 12B, and FIG. 12C show an example adsorption measurement procedure in accordance with embodiments of the present disclosure.
Figure 12B:
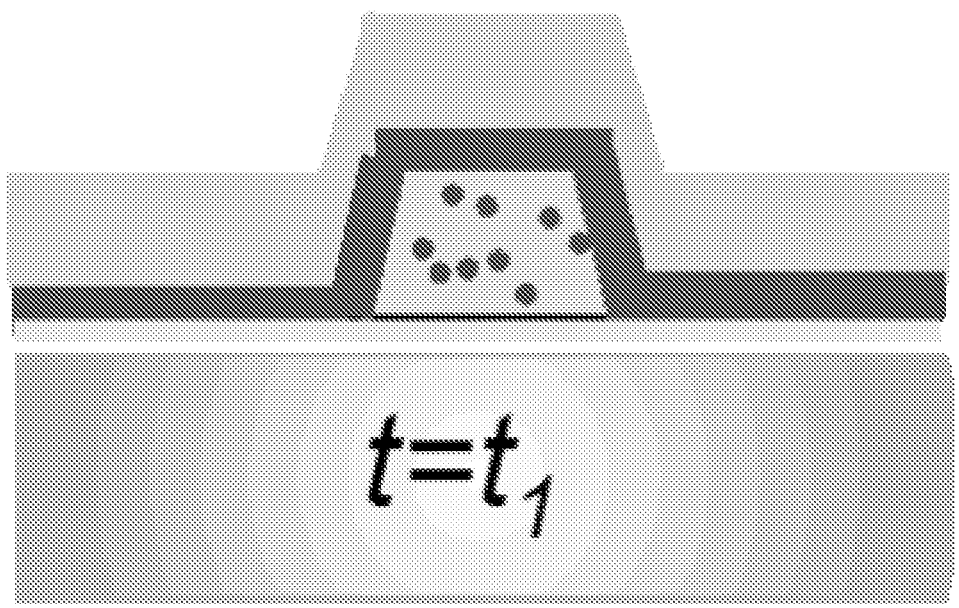
Figure 12C:
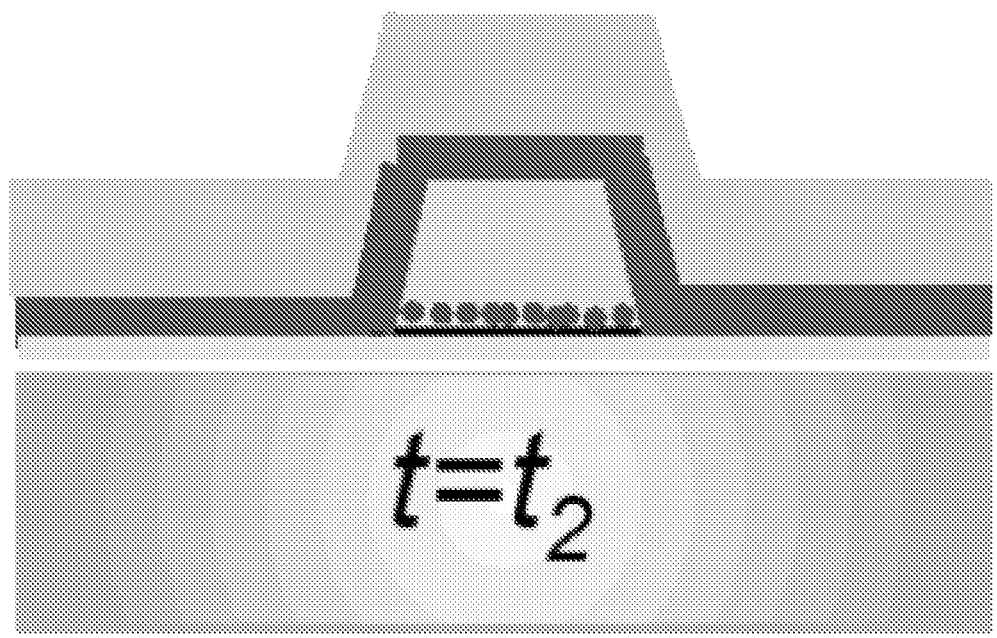

FIG. 12A, FIG. 12B, and FIG. 12C show an example adsorption measurement procedure 1200, 1202, 1204 in accordance with embodiments of the present disclosure. The characterization device 100 allows for simultaneous decoupling of liquid density and mass adsorption capability. In an example application, when some of the biomolecules in a solution are adsorbed on a surface, the mass on the surface increases while the density and the viscosity of the solution are expected to decrease. As was previously explained, the characterization device 100 can measure the mass inside the microfluidic channels 100 and this measurement is not affected by the viscosity of liquid. For relatively longer acoustic wavelengths (i.e. lower resonance frequencies when compared to the fundamental mode of the characterization device 100), the device 100 measures the total weight inside the channels 100 and cannot observe any frequency shifts when the mass is adsorbed. This is a marked improvement over conventional QCM systems, wherein a higher resonance mode is monitored simultaneously with that of monitoring the longer wavelengths, thus the position of the mass becomes a factor due to this longer wavelength. In these conventional systems, the adsorption of the molecules decrease their concentration in the solution, which decreases the density. Thus, resulting in an increase of the resonance frequency.

Still referring to FIG. 12A, FIG. 12B, and FIG. 12C, an adsorption measurement procedure 1200, 1202, 1204 for the characterization device 100 and corresponding simulation results are depicted. At $t_0$ 1200, pure water is introduced to the channels 102 and the resonance frequencies are used as baselines. At $t_1$ 1202, a biomolecular solution (which can be assumed to just contain biomolecules and water for simplicity in calculation) of 2.3 mg/ml is introduced. According to the transmission line model simulations performed for these parameters and channel 102 dimensions as previously described with 50% surface coverage, this solution causes the resonance frequencies to decrease since it has slightly higher density than water. Then, at $t_2$ 1204, it was assumed that all biomolecules in the solution had adsorbed onto the surface of the crystal of the sensor platform and a simulation was made of the expected resonance frequency shifts for the first and $7^{th}$ mode. The first mode does not show any additional frequency shifts related to the adsorption of molecules because it weighs the whole channel 102 material with the same coefficient. But for the $7^{th}$ mode, which operates at, in an example, 35 MHz, the wavelength is small enough to be affected by the position of the particles and the resonance frequency decreases further when particles are adsorbed. Analyzing the characterization device 100 using these simulations and models can provide a better understanding of the measurement results when more than one resonance modes are present, making it possible to differentiate between density changes and adsorption changes in the liquid and to enable better channel design parameters.

To further explain the gain in sensitivity, a simulation of the normalized conductance of the fundamental resonance of a conventional 5 MHz QCM crystal for different scenarios was made and compared with that of the characterization device 100. Bringing a conventional polished crystal surface in contact with water decreases the resonance frequency and lowers the Q-factor. Since the resonance peak is much broader in liquid, it is more difficult to detect the center frequency. However, since the center frequency is used to identify the coupled mass, the mass resolution decreases in the conventional QCM. In these simulations, an examination can then be made of the characterization device 100 comprising a conventional QCM as a sensor platform wherein the platform's surface is covered with, in an example, 1.5 um aluminum layer, with $\frac{1}{6}^{th}$ of the surface being covered with, in an example, 1.7 um thick microfluidic channels 102. It was found that depositing the material for microfluidic channels 102 on the conventional QCM crystal reduces the QCM's fundamental resonance frequency by about 23.5 kHz. Moreover, filling the microfluidic channels 102 with water further reduces the resonance frequency but more importantly, retains a high Q-factor due to the water being trapped inside the channels 102 as a strongly coupled mass. Therefore, the center frequency can be detected with equal sensitivity as in measurements in gaseous environments.

FIG. 13A and FIG. 13B shows an example implementation of the characterization device 100 in a circuit 1300 and a handheld device 1302 in accordance with embodiments of the present disclosure. The characterization device 100, possessing low-cost and low fluid-volume traits, can be used with a hand-held device 1302 to measure the analytes in liquid with orders of magnitude higher sensitivity than current shear mode resonator based technologies. The use of microfluidic channels 102 integrated onto a sensor platform such as a thickness-shear mode resonator enables the liquid to be trapped in the microfluidic channels 102, thus reducing viscous damping. This enables the Q-factors of the resonator to remain high during measurements involving liquids, which improves the sensitivity. Advantages of the characterization device 100 include:

Thinner devices because they need less handling than conventional QCMs.
  Being vacuum-sealed in packages with inlet cavity and outlet cavity etch holes 800 for fluid introduction and removal.
  No need for sealing on one side (i.e. no O-rings or clamps) since the fluid flows inside the channels 102.
  Irrelevant surface roughness.

Still referring to FIG. 13A and FIG. 13B, the characterization device 100 avoids the limitations inherent in conventional QCMs and TSRs sensors because of the addition of the fluidic channels 102. In addition, since the characterization device 100 has high Q-factors during measurements in liquid, it can use much simpler circuits 1300, such as a simple oscillator and frequency counter. The benefits of which include:

The ability to use resonators similar to the electronic circuit resonators as the sensor platform along with the incorporation of simple electronics enables significant miniaturization of the characterization device 100.

The characterization device 100 and associated electronics can be packaged as a small handheld device 1302 that can connect to a small computing device, such as a smartphone or tablet, wherein the computing device can serve as the power source and user interface.

The microfluidic nature of characterization device 100 enables use of very small amounts of liquid, on the order of nanoliters.

The surface of the microfluidic channels 102 can be covered with, in an example, antibodies specific to certain biomarkers and the binding of these biomarkers in the liquid will reduce the resonance frequency of the resonator, enabling detection using a frequency counter incorporated with the characterization device 100.

Furthermore, it has been shown that the minimum detectable mass for a conventional 5 MHz QCM crystal is 0.5 ng/cm$^2$ in an aqueous environment and the minimum detectable mass is 0.05 ng/cm$^2$ in air, which is an order of magnitude lower. In contrast, in an example, a 5 MHz characterization device 100 on a sensor platform such as a TSR can achieve the small minimum detectable mass of 0.05 ng/cm$^2$ like in air, but while measuring an analyte in liquid. This shows remarkable sensitivity. In addition, this analysis can be done not in a lab setting but using a hand-held device 1302 outside the lab, such as in a point-of-care (POC) diagnostics instrument.

Still referring to FIG. 13A and FIG. 13B, small TSR mass sensor packages, which has electrical connections and hermetic packaging similar to TSR used in electronic devices, can be used in conjunction with the embedded fluidic channels 100 of the characterization device 100 for portability. The liquid sample can be directed to the surface through the fluid connectors and microfluidic channels 102 while the rest of the device is in vacuum. The electrical legs can connect to the circuit board 1300 containing the oscillator and frequency counter, while the fluid connectors can be attached to small fluid chambers to receive the liquid sample and dispose the waste, as shown in FIG. 13A. This sensor package can act as a cartridge, allowing ease of replacement with the main instrument 1300, as shown in FIG. 13B 1302. The rest of the instrument 1300 contains circuit board and fluidic parts, for e.g., fluidic filter, pump or syringe connections, etc. In an example, the instrument 1300 can be powered with batteries and contain a digital screen. Alternatively, the sensor package can be connected to a small computing device 1302 (such as a smartphone, tablet, laptop, etc.), wherein the computing device can serve as a power source, a screen, and a user interface.

Still referring to FIG. 13A and FIG. 13B 1300, 1302, in an example, current lab-on-a-chip technology heavily uses optical sensing of particulates in microfluidic applications. Because of this, transparent materials, light sources, cameras, and photodiodes are required. In contrast, the resonance frequency shifts in the characterization device 100 can be detected electronically by measuring the impedance of the device or the resonating charges. As a result, making compact lab-on-a-chip devices possible.

FIG. 14A and FIG. 14B show example plots comparing the respective harmonic number 1400 normalized frequency shifts and dissipation 1402 increase of the characterization device 100 with that of the conventional quartz crystal microbalance (QCM) sensors. The frequency comparison plot 1400 of the harmonic number (N) normalized frequency shifts shows the shifts due to the introduction of water into the fluidic channels 102 of the characterization device 100 that incorporates a sensor platform such as a QCM sensor, versus the introduction of water into the conventional polished QCM sensor. The dissipation plot 1402 shows a comparison plot of the dissipation increase due to the introduction of water into the fluidic channels 102 of the characterization device 100 that incorporates a sensor platform such as a QCM sensor, versus the introduction of water into the conventional polished QCM sensor at different harmonics.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. In another example, a computing device may be any type of conventional computer, such as a laptop computer or a tablet computer or a desktop computer. In another example, the computing device may be a type of network device such as a router or a switch. In another example, the computing device may be a smart television or a high definition television. In another example, the computing device may be a battery powered Internet of Things (IoT) device. In another example, a computing device may be a mobile computing device such as, for example, but not limited to, a smart phone, a cell phone, a pager, a personal digital assistant (PDA), a mobile computer with a smart phone client, or the like. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on servers in a datacenter, the examples may similarly be implemented on any suitable computing device or computing devices.

The present subject matter may be a system, an apparatus, a method, and/or a computer program product. Aspects of the present subject matter are described herein with reference to flowchart illustrations and/or block diagrams of methods and apparatus/systems according to embodiments of the subject matter. It will be understood that each block of the flowchart illustrations and/or block diagrams, and combinations of blocks in the flowchart illustrations and/or block diagrams, can be implemented by computer readable program instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

The flowchart and block diagrams in the Figures illustrate the architecture, functionality, and operation of possible implementations of systems and methods according to various embodiments of the present subject matter. In this regard, each block in the flowchart or block diagrams may represent a module, segment, or portion of instructions, which comprises one or more executable instructions for implementing the present disclosure. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, the order of the blocks should not be constrained therein.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:
1. A method comprising:
providing a characterization device comprising:
a plurality of covered fluidic channels with a predetermined orientation; and
a sensor platform comprising a non-sensing region and at least one of an active region, a sensitive region, and a central sensing region, wherein the plurality of covered fluidic channels are positioned on a surface of the sensor platform over a portion of the at least one of the active region, the sensitive region, and the central sensing region;
receiving at least one of a liquid and an analyte of interest into the plurality of covered fluidic channels;
confining the at least one of the liquid and the analyte of interest within the plurality of covered fluidic channels;
generating a shear motion on the surface of the sensor platform for application to the at least one of the liquid and the analyte of interest within the plurality of covered fluidic channels; and
analyzing properties of the at least one of the liquid and the analyte interest, wherein analyzing properties comprises analyzing of a mass property of the liquid via a perpendicular orientation of the plurality of covered fluidic channels and/or analyzing a mass property of an analyte attached to a channel surface of the plurality of covered fluidic channels via at least one of the perpendicular orientation and a parallel orientation of the plurality of covered fluidic channels.

2. The method of claim 1, wherein the at least one of the liquid and the analyte of interest comprises at least one of a liquid mixture, blood, oil, and an analyte.

3. The method of claim 1, wherein the predetermined orientation is based on a surface motion of the sensor platform.

4. The method of claim 3, wherein the predetermined orientation comprises at least one of a perpendicular orientation of the plurality of covered fluidic channels, a parallel orientation of the fluidic channels, and a combination of the parallel orientation and the perpendicular orientation.

5. The method of claim 4, wherein the combination of the parallel orientation and the perpendicular orientation are arranged in at least one of a serial configuration and a parallel configuration on the sensor platform.

6. The method of claim 1, wherein analyzing properties further comprises at least one of analyzing a density property via only a perpendicular orientation of the plurality of covered fluidic channels, analyzing a product of a fluid viscosity and density via a parallel orientation of the plurality of covered fluidic channels, and analyzing a fluid viscosity via a combination of the parallel and the perpendicular orientation of the plurality of covered fluidic channels.

7. A characterization device comprising:
a plurality of covered fluidic channels with a predetermined orientation;
a sensor platform comprising a non-sensing region and at least one of an active region, a sensitive region, and a central sensing region, wherein the plurality of covered fluidic channels are positioned on a surface of the sensor platform over a portion of the at least one of the active region, the sensitive region, and the central sensing region;
an inlet configured to receive at least one of a liquid and an analyte of interest into the covered fluidic channels, wherein the at least one of the liquid and the analyte of interest are confined by the covered fluidic channels;
a resonator configured to generate a shear motion on the surface of the sensor platform for application to the at least one of the liquid and the analyte of interest within the plurality of covered fluidic channels; and
an analyzer configured to analyze properties of at least one of the liquid and the analyte interest, and
wherein the predetermined orientation comprises either a perpendicular orientation to sense a mass property of the liquid, or at least one of a parallel orientation to sense a mass property of an analyte attached to a channel surface of the plurality of covered fluidic channel.

8. The characterization device of claim 7, wherein the orientation further comprises at least one of a parallel orientation to sense a product of a fluid viscosity and density, a perpendicular orientation to sense a density property, and a combination of the parallel orientation and the perpendicular orientation to sense a fluid viscosity.

9. The characterization device of claim 8, wherein the combination of the parallel orientation and the perpendicular orientation is arranged in either a serial configuration or a parallel configuration on the sensor platform.

10. The characterization device of claim 7, wherein the plurality of covered fluidic channels have a predetermined height based on a measure of an acoustic wavelength inside channel walls at an operating frequency range, and wherein the height is set to be lower than the measured acoustic wavelength.

11. The characterization device of claim 10, wherein the operating frequency range comprises at least one of a harmonic range of the sensor platform and a surface acoustic wave actuation frequency.

12. The characterization device of claim 7, wherein the plurality of covered fluidic channels have a predetermined width based on a predetermined height of the plurality of covered fluidic channels and an operating frequency of the characterization device.

13. The characterization device of claim 7, further comprising an adhesion mechanism comprising at least one of a gold layer between the plurality of covered fluidic channels and the sensor platform, a silicon layer between the plurality of covered fluidic channels and the sensor platform, and a silicon dioxide layer between the plurality of covered fluidic channels and the sensor platform.

14. A method comprising:
fabricating a characterization device comprising:
a plurality of covered fluidic channels comprising a predetermined width and height with predetermined orientation;
a sensor platform comprising a non-sensing region and at least one of an active region, a sensitive region, and a central sensing region, wherein the plurality of covered fluidic channels are positioned on a surface of the sensor platform over a portion of the at least one of the active region, the sensitive region, and the central sensing region;
an inlet configured to receive at least one of a liquid and an analyte of interest into the covered fluidic channels, wherein the at least one of the liquid and the analyte of interest are confined by the covered fluidic channels;
an adhesion mechanism configured to attach the sensor platform to the plurality of covered fluidic channels;
a resonator configured to generate a shear motion on the surface of the sensor platform for application to the at least one of the liquid and the analyte of interest within the plurality of covered fluidic channels; and
an analyzer configured to analyze properties of at least one of the liquid and the analyte interest, and
wherein the orientation comprises either a perpendicular orientation to sense a mass property of the liquid, or a parallel orientation of the covered fluidic channel to sense a mass property of an analyte attached to a channel surface of the plurality of covered fluidic channels.

15. The method of claim 14, wherein the predetermined orientation further comprises at least one of a parallel orientation to sense a product of a fluid viscosity and density, a perpendicular orientation to sense a density property, and a combination of the parallel orientation and the perpendicular orientation to sense a fluid viscosity.

16. The method of claim 15, wherein the combination of the parallel orientation and the perpendicular orientation is further arranged in either a serial configuration or a parallel configuration on the sensor platform.

17. The method of claim 14, wherein the adhesion mechanism comprises at least one of a gold layer between the plurality of covered fluidic channels and the sensor platform, a silicon layer between the plurality of covered fluidic channels and the sensor platform, and a silicon dioxide layer between the plurality of covered fluidic channels and the sensor platform.

\* \* \* \* \*